United States Patent [19]

Harris et al.

[11] Patent Number: 5,075,392
[45] Date of Patent: Dec. 24, 1991

[54] THERMOPLASTIC COMPOSITIONS CONTAINING POLYBENZOXAZOLE, POLYBENZOTHIAZOLE AND POLYBENZIMIDAZOLE MOIETIES

[75] Inventors: William J. Harris; Zenon Lysenko; Wen-Fang Hwang, all of Midland, Mich.

[73] Assignee: The Dow Chemical Company, Midland, Mich.

[21] Appl. No.: 327,926

[22] Filed: Mar. 23, 1989

[51] Int. Cl.$^5$ .................. C08L 79/00; C08L 79/06
[52] U.S. Cl. .................. 525/420; 525/425; 525/432; 525/435
[58] Field of Search ............ 525/432, 425, 420, 435

[56] References Cited

U.S. PATENT DOCUMENTS

| | | | |
|---|---|---|---|
| 4,207,407 | 6/1980 | Helminiak | 525/425 |
| 4,377,546 | 3/1983 | Helminiak | 525/425 |
| 4,533,693 | 8/1985 | Wolfe et al. | 524/417 |
| 4,544,713 | 10/1985 | Tsai et al. | 525/432 |
| 4,631,318 | 12/1986 | Hwang et al. | 525/432 |
| 4,749,753 | 6/1988 | Nishihara et al. | 525/411 |
| 4,810,735 | 3/1989 | Uy | 524/157 |

FOREIGN PATENT DOCUMENTS 0298753 1/1989 European Pat. Off. .

OTHER PUBLICATIONS

Hwang et al., *Concept and Overview of Rigid Rod Molecular Composites*, "The Materials Science and Engineering of Rigid Rod Polymers", p. 507 (Materials Research Society, 1989).
Krause, *Morphology of Rigid-Rod Molecular Composites: An Overview*, "The Materials Science and Engineering of Rigid Rod Polymers", p. 511 (Materials Research Society, 1989).
Chauh et al., *The Dynamics of Phase Separation in Rigid-Rod Molecular Composites*, "The Materials Science and Eng. of Rigid Rod Polymers", p. 523 (Materials Research Society, 1989).
Nelson et al., *Kinetics of Phase Separation in Rigid Rod Polymer and Amorphous Polymer Mixtures*, "The Materials Sci. and Eng. of Rigid Rod Polymers", p. 531 (Materials Res. Soc., 1989).
Gabriel et al., *Structure-Property Relationship of Solution-Spun PPBT/PEEK and PPBT/Nylon 6,6 Composite Fibers*, "The Materials Sci. and Eng. of Rigid Rod Polymers", p. 541 (Materials Research Society, 1989).
Hwang et al., *In-Situ Network Composite Fibers of PBZT/Nylon*, "The Materials Science and Engineering of Rigid Rod Polymers", p. 547 (Materials Research Society, 1989).
Haghighat et al., *A Rigid Rod Molecular Composite Processed Directly from the Polymerization Medium*, "The Materials Sci. and Eng. of Rigid Rod Polymers", p. 553, (Materials Research Society, 1989).
Wang et al., *Processing, Properties and Structure of Bulk Poly(p-phenylene Benzobisthiazole)/Poly(ether Ether Ketone) Molecular Composites*, "The Materials Science and Engineering of Rigid Rod Polymers", p. 559 (Materials Research Society, 1989).
Vanderhart et al., *Solid-State NMR Studies of Molecular Composites and Thermally Cured Copolymers*, "The Materials Science and Engineering of Rigid Rod Polymers", p. 569 (Materials Research Society, 1989).

*Primary Examiner*—Ana L. Carrillo

[57] ABSTRACT

The present invention encompasses non-phase-separated thermoplastic block copolymers containing rigid rod PBZ blocks and thermoplastic PBZ blocks; dopes and compositions containing those block copolymers; a process for making shaped articles from thermoplastic block copolymers containing rigid rod PBZ blocks and thermoplastic PBZ blocks; and shaped articles made by that process.

59 Claims, No Drawings

THERMOPLASTIC COMPOSITIONS CONTAINING POLYBENZOXAZOLE, POLYBENZOTHIAZOLE AND POLYBENZIMIDAZOLE MOIETIES

STATEMENT OF GOVERNMENT INTEREST

This invention was made with Government support under contract F33615-86-C-5068 awarded by the Department of the Air Force. The Government has certain rights in this invention.

BACKGROUND OF THE INVENTION

The present invention relates to PBZ polymers (also known as PBX polymers, see definition hereinafter) and polymer compositions containing blocks of those polymers.

PBZ polymers, i.e., polybenzoxazole, polybenzothiazole and polybenzimidazole, and their synthesis are described in great detail in the following references, which are incorporated by reference: Sybert et al., *Liquid Crystalline Polymer Compositions, Process and Products*, U.S. Pat. No. 4,772,678 (Sep. 20, 1988); Wolfe et al., *Liquid Crystalline Polymer Compositions Process and Products*, U.S. Pat. No. 4,703,103 (Oct. 27, 1987); Wolfe et al., *Liquid Crystalline Polymer Compositions, Process and Products*, U.S. Pat. No. 4,533,692 (Aug. 6, 1985); Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985); Evers, *Thermoxidatively Stable Articulated p-Benzobisoxazole and p-Benzobisthiazole Polymers*, U.S. Pat. No. 4,359,567 (Nov. 16, 1982); Tsai et al., *Method for Making Heterocyclic Block Copolymer*, U.S. Pat. No. 4,578,432 (March 25, 1986) and 11 Ency. Poly. Sci. & Eng., *Polybenzothiazoles and Polybenzoxazoles*, 601 (J. Wiley & Sons 1988).

"Rigid rod" PBZ polymers are noted for high tensile strength, high tensile modulus and high thermal stability. Rigid rod PBZ polymers are either intrinsic rigid rods, in which case polymer molecules are essentially rectilinear, or they are articulated rigid rods, in which case they comprise two or more essentially rectilinear polymer moieties linked by a small number of non-linear mer units.

Rigid rod PBZ polymers are difficult to fabricate into useful articles. They do not have glass transition temperatures at any temperature at which they are stable. The polymers are ordinarily dissolved in a mineral acid to form liquid crystal compositions which are then spun to form fibers or processed to form films. Fibers can act as reinforcement agents within a thermosetting matrix, such as epoxy resins, to form strong, light fabricated articles.

To improve processability, rigid rod PBZ polymers can be incorporated into molecular composites with flexible polymers. Hwang et al., "Solution Processing and Properties of Molecular Composite Fibers and Films," 23 *Polymer Eng. & Sci.* 784 (1983); Hwang et al, "Phase Relationships of Rigid Rod Polymer/Flexible Coil Polymer/Solvent Ternary Systems," 23 *Polymer Eng. & Sci.* 789 (1983); and Hwang et al., "Composites on a Molecular Level: Phase Relationships, Processing and Properties," B22 *J. Macromol. Sci.-Phys.* 231 (1983), which are incorporated herein by reference.

Due to the low compatibility of PBZ polymers with thermoplastic or flexible polymers, such composites often experience phase-separation and a resulting loss of strength, clarity or other desirable properties, particularly if heated above the glass transition temperature of the thermoplastic polymer. To improve the compatibility of PBZ polymers, they have been formed in block copolymers with AB-PBO, -PBT or -PBI polymers, a non-thermoplastic flexible coil variant of the PBZ polymer. Tsai, *Method for Making Heterocyclic Block Copolymer*, U.S. Pat. No. 4,544,713 (Oct. 1, 1985) Gordon et al., "Synthesis and Characterization of Segmented Block Copolybenzimidazoles Containing Rigid Rod and Flexible Coil Segments," 28(2) *Polymer Preprints* 308 (1987): Gordon et al., "Thermally Stable Block Copolymers," 26(1) *Polymer Preprints* 146 (1985); Tsai et al., "High Strength Modulus ABA Block Copolymers," 26(1) *Polymer Preprints* 144 (1985); Krause et al., "Morphology and Mechanical Properties of a Phase-separated and a Molecular Composite 30% PBT/70% ABPBI Triblock Copolymer," 29 *Polymer* 195 (1988); Evers, "Graft Copolymers of Rodlike Poly(p-phenylenebenzobisimidazole)," 29(1) *Polymer Preprints* 244 (1988); and Gordon et al., "Thermally Stable Block Copolymers," 27(1) *Polymer Preprints* 311 (1986). However, it has not been reported that any thermoplastic composition containing rigid rod PBZ polymer can be heated to its glass transition temperature without substantial phase-separation.

What are needed are new compositions containing rigid rod PBZ moieties which are thermoplastic and do not experience substantial phase-separation even after being heated and shaped at their glass transition temperature.

SUMMARY OF THE INVENTION

A first aspect of the present invention is a substantially non-phase-separated block copolymer comprising:

(1) a rigid rod PBZ block containing at least 10 mer units: and (2) a thermoplastic PBZ block containing a plurality of mer units, which substantially non-phase-separated block copolymer has a glass transition temperature below its decomposition temperature and can be heated to its glass transition temperature without experiencing substantial phase-separation.

A second aspect of the present invention is a dope composition comprising:

(1) a mineral acid; and (2) a block copolymer containing:

(a) a rigid rod PBZ block containing at least 10 mer units; and (b) a thermoplastic PBZ block containing a plurality of mer units, which dope composition is in a optically isotropic phase.

A third aspect of the present invention is a substantially non-phase-separated polymer composition comprising a block copolymer of the present invention.

A fourth aspect of the present invention is a process for forming a shaped article comprising the steps of:

(1) heating a block copolymer or a polymer composition of the present invention to a temperature at which said block copolymer or composition is plastic; and (2) forming said block copolymer or composition into a shaped article while it is at a temperature at which it is plastic.

A fifth aspect of the present invention is a shaped article comprising a block copolymer or polymer composition of the present invention, wherein polymer in the shaped article is not substantially phase-separated.

Dopes of the present invention are coagulated by dilution and/or hydrolysis of the mineral acid using polymer non-solvents to form block copolymers and polymer compositions of the present invention, preferably in the form of shaped articles such as fibers and films. Fibers, films and powders containing block copolymers and polymer compositions of the present invention can be shaped by the process of the present invention to form shaped articles such as laminates which are not substantially phase-separated. The fibers, films and other shaped articles have a high tensile strength and tensile modulus. Fibers may also be used as reinforcement in matrix composites.

DETAILED DESCRIPTION OF THE INVENTION DEFINITIONS

The following terms, which are used repeatedly throughout this application, have the meanings and preferred embodiments set out hereinafter unless otherwise specified.

Aromatic group (Ar)—any aromatic ring or ring system. Size is not critical as long as the aromatic group is not so big that it prevents further reactions of the moiety in which it is incorporated. Each aromatic group independently preferably comprises no more than about 18 carbon atoms, more preferably no more than about 12 carbon atoms and most preferably no more than about 6 carbon atoms. Each may be heterocyclic but is preferably carbocyclic and more preferably hydrocarbyl. If the aromatic group is heterocyclic, the heteroatom is preferably nitrogen.

Unless otherwise specified, each aromatic group may comprise a single aromatic ring, a fused ring system or an unfused ring system containing two or more aromatic moieties joined by bonds or by divalent moieties which are inert with respect to PBZ polymerizing reagents under polymerization conditions. Suitable divalent moieties include those identified for the divalent linking moiety (X) described hereinafter. Each aromatic group is preferably a single six-membered ring.

Each aromatic group may contain substituents which are stable in mineral acid and do not interfere with the polymerization of PBZ monomers. Examples of preferred substituents include halogens, alkoxy moieties, aryloxy moieties or alkyl groups. More preferred substituents are either an alkyl group having no more than about 6 carbon atoms or a halogen. Most preferably, each aromatic group contains only those substituents specifically called for hereinafter.

Azole ring—an oxazole, thiazole or imidazole ring. The carbon atom bonded to both the nitrogen atom and the oxygen, sulfur or second nitrogen atom is the 2-carbon, as depicted in formula 1

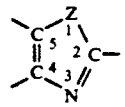

wherein Z is —O—, —S— or —NR—; and R is hydrogen, an aromatic or an aliphatic group, preferably hydrogen or an alkyl group, and most preferably hydrogen. R preferably comprises no more than about 6 carbon atoms, more preferably no more than about 4 and most preferably no more than about 1. Each azole ring is independently preferably oxazole or thiazole and more preferably oxazole. In PBZ polymers, the 4- and 5-carbons of each azole ring are fused with an aromatic group.

Azole-forming moiety—an "o-amino-basic moiety" or "electron-deficient carbon group," as those terms are hereinafter defined.

o-Amino-basic moiety—a moiety, which is bonded to an aromatic group, consisting of (1) a primary amine group bonded to the aromatic group and
(2) a hydroxy, thiol or primary or secondary amine group bonded to the aromatic group ortho to said primary amine group.

It preferably comprises a hydroxy, thiol or primary amine moiety, more preferably comprises a hydroxy or thiol moiety, and most preferably comprises a hydroxy moiety. Secondary amine groups comprise an aromatic or an aliphatic group and preferably an alkyl group. The secondary amine group preferably comprises no more than about 6 carbon atoms, more preferably no more than about 4 carbon atoms and most preferably no more than about 1 carbon atom.

Electron-deficient carbon group (Q)—any group containing a carbon atom which can react in the mineral acid with an o-amino-basic moiety to form an azole ring, such as the groups listed in column 24, lines 59–66 of U.S. Pat. No. 4,533,693, which is incorporated herein by reference. Preferred electron-deficient carbon groups are carboxylic acids, acid halides, metal carboxylate salts, cyano groups and trihalomethyl groups. Halogens in electron-deficient carbon groups are preferably flourine chlorine or bromine and more preferably chlorine.

Mineral acid—any non-oxidizing liquid acid capable of dissolving PBZ polymers, such as sulfuric acid, methanesulfonic acid, trifluoromethanesulfonic acid, polyphosphoric acid and mixtures thereof. It must be sufficiently non-oxidizing that it does not substantially oxidize AB- and BB-PBZ monomers which are dissolved therein. Mineral acids are preferably dehydrating acids, such as polyphosphoric acid or a mixture of methanesulfonic acid and phosphorus pentoxide.

Polyphosphoric acid preferably has a $P_2O_5$ content by weight of at least about 70 percent, more preferably at least about 75 percent and preferably has a $P_2O_5$ content of at most about 90 percent, more preferably at most about 86 percent. The ratio of methanesulfonic acid to phosphorus pentoxide in mixtures of those compounds is preferably no more than about 20:1 by weight and no less than about 5:1 by weight.

PBZ polymer—A polymer from the group of polybenzoxazoles and polybenzobisoxazoles (PBO), polybenzothiazoles and polybenzobisthiazoles (PBT) and polybenzimidazoles or polybenzobisimidazoles (PBI). For the purposes of this application, the term "polybenzoxazole (PBO)" refers broadly to polymers in which each unit contains an oxazole ring bonded to an aromatic group, which need not necessarily be a benzene ring. The term "polybenzoxazole (PBO)" also refers broadly to poly(phenylene-benzo-bis-oxazole)s and other polymers wherein each unit comprises a plurality of oxazole rings fused to an aromatic group. The same understandings shall apply to the terms polybenzothiazole (PBT) and polybenzimidazole (PBI).

Rigid Rod PBZ polymer—An "intrinsic" or "articulated" rigid rod PBZ polymer as the terms "intrinsic" and "articulated" are defined in Hwang, "Processing, Structure and Properties of Liquid Crystalline PBT Polymer," Kansai Committee of the Society of Fiber Science and Technology, Japan, Post Symposium on Formation, Structure and Properties of High Modulus and High Tenacity Fibers 23-26 (Aug. 26, 1985); Evers et al., "Articulated All-Para Polymers with 2,6-Benzobisoxazole, 2,6-Benzobisthiazole, and 2,6-Benzobisimidazole Units in the Backbone," 14 Macromolecules 925 (1981); Evers, "Thermooxidatively Stable Articulated Benzobisoxazole and Benzobisthiazole Polymers," 24 J. Poly. Sci. Part A 1863 (1986) and Evers et al., *Articulated Para-Ordered Aromatic Heterocyclic Polymers Containing Diphenoxybenzene Structures*, U.S. Pat. No. 4,229,566 (Oct. 21, 1980).

Intrinsic rigid rod polymers are essentially rectilinear and have a persistence length comparable to their contour length. Articulated rigid rod polymers comprise a plurality of essentially rectilinear moieties joined by a relatively small number of non-linear moieties. Rigid rod PBZ polymers used in the present invention are preferably intrinsic rigid rod polymers. If articulated, they preferably comprise on average no more than about 1 non-linear mer unit for each 9 essentially rectilinear mer units.

Rigid Rod PBZ Polymers

Block copolymers of the present invention contain blocks of rigid rod PBZ polymer, as that term is previously defined. The chemical structure and synthesis of PBZ polymers are discussed in detail in U.S. Pat. Nos. 4,772,678: 4,703,103: 4,533,692; 4,533,724; 4,533,693; 4,359,567; and 4,578,432, which are previously incorporated by reference. The preferred synthesis is described in U.S. Pat. No. 4,533,693.

Each rigid rod PBZ block comprises by number average at least about ten mer units which are essentially rectilinear. Each rectilinear mer unit preferably comprises:

(1) a first aromatic group ($Ar^1$), which is a single ring or a fused ring system;
(2) a first azole ring, which is fused with the first aromatic group;
(3) a second azole ring, which is fused with the first aromatic group such that each carbon atom shared by the second azole ring and the first aromatic group is para to a carbon atom shared by the first azole ring and the first aromatic group, i.e., the first azole ring is fused in 1 and 2 position and the second azole ring is fused in 4 and 5 position on a single ring, or the first azole ring is fused in 2 and 3 position and the second azole ring in 6 and 7 position on a system of two fused rings, and so on; and
(4) a second aromatic group ($Ar^2$) bonded by a single bond to the 2-carbon of the second azole ring.

The mer units are preferably linked by a single bond from the second aromatic group ($Ar^2$) of one mer unit to the 2-carbon of the first azole ring in an adjacent mer unit. The two bonds to the second aromatic group must be in para position with respect to each other. The second aromatic group ($Ar^2$) may not comprise two unfused rings joined by a divalent moiety, as previously described.

Except as specified in the previous description, the first and second aromatic groups have the definitions and preferred embodiments previously given for aromatic groups. The first aromatic group ($Ar^1$) is most preferably a 1,2,4,5-phenylene moiety. The second aromatic group ($Ar^2$) is highly preferably either a 1,4-phenylene or a 4,4'-biphenylene group, and most preferably a 1,4-phenylene group.

Mer units in rigid rod blocks preferably comply with the following formula:

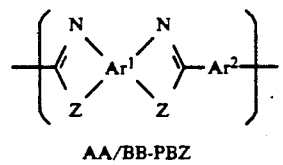

AA/BB-PBZ wherein:
(1) $Ar^1$ is a first aromatic group as previously described;
(2) $Ar^2$ is a second aromatic group as previously described; and
(3) each Z independently has the meaning previously assigned in describing azole rings.

(Where nitrogen atoms and Z groups are depicted as being bonded to an aromatic group without depicting specific positions, as in Formula 6, it shall be understood that:
(1) the nitrogen atom and the Z group within an azole ring are bonded to carbon atoms in the first aromatic group which are in ortho position with respect to each other; and
(2) the nitrogen atoms and the Z groups of different azole rings may be in either cis- or trans- position with respect to each other, as those terms are defined in 11 Ency. Poly Sci. & Eng., supra, at 602, which is incorporated herein by reference.

The same understandings shall hold true for amine groups and Z groups in the o-amino-basic moieties of monomers used to make PBZ polymers.)

The first aromatic group ($Ar^1$) preferably conforms to one of Formulae 3(a)–(g) or a substituted or heterocyclic variation thereof, more preferably conforms to one of Formulae 3(a), (f) or (g), and most preferably conforms to Formula 3(a).

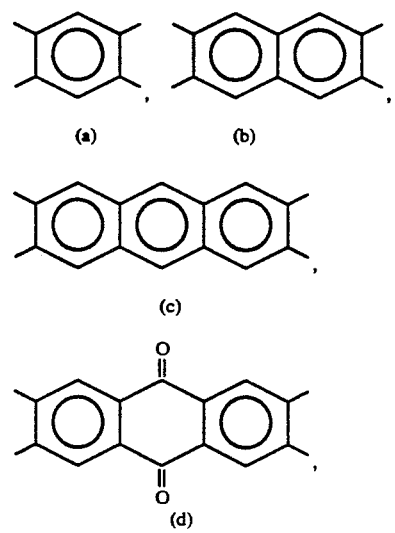

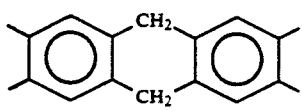

(e)

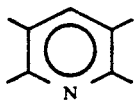 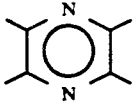

(f)    (g)

The second aromatic group (Ar²) preferably conforms to one of Formulae 4(a)–(c) or a substituted or heterocyclic variation thereof, such as a pyridinyl moiety or a pyrimidinyl moiety. The second aromatic group (Ar²) more preferably conforms to one of Formulae 4(a) or (b) and most preferably conforms to Formula 4(a).

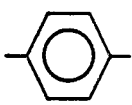 

(a)    (b)

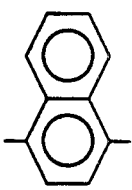

(c)

Mer units in rigid rod blocks most preferably conform with one of formulae 5(a)–(d).

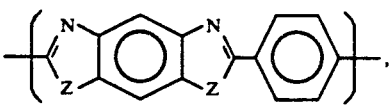

(a)

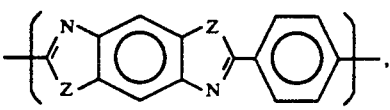

(b)

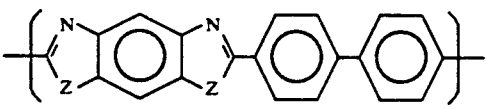

(c)

and

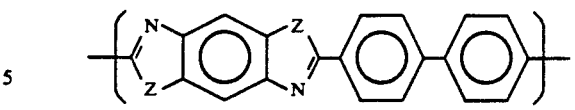

(d)

"Intrinsic rigid rod" PBZ blocks, as that term is previously defined, are made up entirely of the essentially rectilinear mer units as previously described. "Articulated rigid rod" PBZ blocks may also contain a small number of "non-linear" mer units wherein:

(1) the first aromatic group is fused to only one azole ring (AB-PBZ); or (2) the first and second azole rings are fused to the first aromatic group in other than "para" position with respect to each other, i.e., at the 1,2 position and the 3,4 position on a six-membered ring; or (3) the first aromatic group is an unfused system with the azole rings fused to separate six-membered rings; or (4) the bonds to the second aromatic group are in other than para position with respect to each other, i.e., the second aromatic group is a 1,3-phenylene group; or (5) the second aromatic group is an unfused aromatic group comprising two or more aromatic moieties linked by a bond or a divalent moiety, such as —O—, —S—, —CO— or —SO$_2$—.

In an articulated rigid rod PBZ block, the non-linear mer units should make up no more than about 10 percent of the mer units in the block, and preferably no more than about 3 percent. Most preferably, the rigid rod block is an intrinsic rigid rod.

Rigid rod PBZ blocks comprise by number average at least about 10 mer units, preferably at least about 20 mer units, and more preferably at least about 25 mer units. The rigid rod PBZ blocks preferably comprise by number average at most about 100 mer units, and more preferably at most about 50 mer units. The inherent viscosity of the rigid rod PBZ block as a homopolymer before it is incorporated into the block copolymer in methanesulfonic acid at 25° C. and 0.05 dL/g concentration is preferably at least about 3 dL/g, more preferably at least about 5 dL/g and most preferably at least about 6 dL/g. The intrinsic viscosity is preferably at most about 17 dL/g, more preferably at most about 10 dL/g and most preferably at most about 7 dL/g.

Rigid rod PBZ blocks are preferably synthesized initially as a rigid rod PBZ polymer or oligomer. To synthesize rigid rod PBZ polymer, an AA-monomer is contacted with a BB-monomer under conditions such that the monomers react to form an AA/BB-PBZ polymer. (The terms AA-monomer and BB-monomer are described in 11 Ency. Poly. Sci. & Eng., supra, at 608–610 and are incorporated herein by reference.)

The BB-monomer comprises:

(1) a first aromatic group (Ar¹), which is either a single ring or a fused ring system; and (2) two o-amino-basic moieties bonded to said first aromatic group in a position such that each group in the first o-amino-basic moiety is para with respect to a group in the second o-amino-basic moiety.

The first aromatic group (Ar¹) has the limitations and preferred embodiments previously described for the first aromatic group of a rigid rod PBZ mer unit. The BB-monomer preferably complies with formula 6:

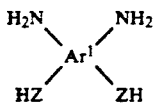

6 wherein:
Ar$^1$ is a first aromatic group as previously described; and
each Z is ortho to one primary amine group and conforms to the descriptions previously given for Z moieties.

The BB-monomer is highly preferably as illustrated in in Formulae 7(a) or (b) or a salt thereof:

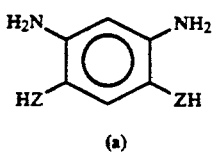 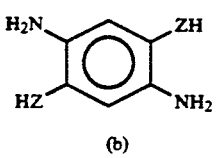 7

(a)  (b)

and is most preferably 4,6-diaminoresorcinol, 2,5-diaminohydroquinone or a salt thereof.

Of course, a mixture of BB-monomers, such as 4,6-diaminoresorcinol and 1,3-dithio-4,6-diaminobenzene, can be used to prepare random copolymers. BB-monomers are susceptible to air oxidation and are typically stored as their hydrogen chloride salts. The monomer is regenerated in situ by a dehydrohalogenation step well-known to persons of ordinary skill in the art.

The AA-monomer preferably comprises:

(1) a second aromatic group (Ar$^2$) as previously defined in describing the rigid rod PBZ mer units: and (2) a first and a second electron-deficient carbon group, as that term is previously defined, the electron-deficient carbon groups being bonded to the second aromatic moiety in para position with respect to each other.

The second aromatic group has the limitations and preferred embodiments previously set out. The AA-monomer preferably complies with Formula 8

Q—Ar$^2$—Q  8 wherein Q is an electron-deficient carbon group as previously defined and Ar$^2$ is a second aromatic moiety as previously defined. The AA-monomer is most preferably terephthalic acid or terephthaloyl chloride.

Certain AA- and BB-monomers are commercially available. Others can be synthesized by obvious variations upon known techniques. BB-monomers suitable to form rigid rod PBZ and references to their synthesis or suppliers are found in U.S. Pat. No. 4,533,693, Columns 19-21 at Table 1, in Lysenko, *High Purity Process for the Preparation of* 4,6-Diamino-1,3-Benzenediol, U.S. Pat. No. 4,766,244 (Aug. 23, 1988) and in Inbasekaran, *Preparation of Diamino- and Dialkylaminobenzenediols,* U.S. Pat. No. 4,806,688 (Feb. 21, 1989). AA-monomers suitable to form rigid rod PBZ and references to their synthesis or suppliers are found in U.S. Pat. No. 4,533,693, Columns 25-29 at Table 4 (all shown except 2e-2h) and Table 5 (2 aa and bb). If an articulated rigid rod block is desired, appropriate BB-monomers for forming non-linear mer units and references to their synthesis are found in U.S. Pat. No. 4,533,693, Columns 21-22 and 23-24 at Tables 2 and 3, and appropriate AA-monomers and references to their synthesis are found in U.S. Pat. No. 4,533,693, columns 26 and 29-32 at Table 4 (2e-2h), Table 5 (except for 2 aa and bb) and Table 6. All of the above are incorporated by reference.

Reaction conditions for forming the rigid rod PBZ block or polymers are discussed at length in U.S. Pat. Nos. 4,772,678; 4,703,103; 4,533,724; 4,533,692; 4,533,693 and 4,578,432 and in 11 Ency. Poly. Sci. & Eng., supra, at 611-21, which are incorporated by reference. The reaction takes place in a non-oxidizing mineral acid capable of dissolving the resulting polymer or oligomer. The mineral acid is preferably polyphosphoric acid. In very dilute solutions, the P$_2$O$_5$ content of the polyphosphoric acid may be as high as about 85 percent and the dehydrohalogenation step and reaction may be run in that solution. In more concentrated solutions, the P$_2$O$_5$ content of the polyphosphoric acid is preferably about 76 percent at the commencement of the reaction, and P$_2$O$_5$ is preferably added following dehydrohalogenation and during the reaction to increase that content, as described in U.S. Pat. No. 4,533,693 from Column 42, line 61 to Column 45, line 62, which is incorporated herein by reference.

The reaction is performed under an inert atmosphere, for instance under nitrogen, argon or helium. The pressure of the reaction is not critical as long as the solvent acid remains in liquid form and the reagents do not sublime. The reaction may be continued for any length of time necessary to bring about the desired conversion of monomer to polymer.

Although the reaction can occur at low temperatures, it occurs only very slowly at temperatures below about 40° C. On the other hand, some monomers such as terephthaloyl chloride can sublime at high temperatures and others may become slightly unstable at high temperatures. The temperature at the commencement of the polymerization is preferably relatively no more than about 70° C., more preferably no more than about 65° C. and more preferably no more than about 55° C. It is preferably no less than about 40° C. and more preferably no less than about 45° C. That temperature is preferably maintained for a period of time long enough to form oligomer and/or low molecular weight polymer. Thereafter, the temperature is preferably raised stepwise throughout the course of the reaction. The maximum temperature achieved during the reaction is preferably at least about 70° C., more preferably at least about 95° C., more highly preferably at least about 150° C. and most preferably at least about 190° C. The maximum temperature of the reaction may go up to any point at which the polymer and solvent are stable. The maximum temperature is preferably no more than about 240° C., more preferably no more than about 225° C. and most preferably no more than about 210° C.

The time for the reaction varies widely depending upon the reagents and temperatures used, in a manner familiar to persons skilled in the art. The reaction preferably proceeds at between about 190° C. and 210° C. for at least about 30 minutes Excesses of BB-monomer will shorten the polymer chain in a manner familiar to persons skilled in the art. Preferably, neither monomer is in more than about a 10 percent molar excess: more preferably, neither monomer is in more than about a 5 percent molar excess; most preferably neither monomer is in more than about a 2 percent molar excess. Preferably, a slight excess of the BB-monomer is used: more preferably an excess of at least about 1 mole percent is used.

The concentration of monomer in solvent is preferably at least about 0.5 weight percent, more preferably at least about 3 weight percent and most preferably at least about 6 weight percent. Many monomers, such as terephthalic acid and 4,4'-bis(benzoic acid), and the resulting polymers are only sparingly soluble in mineral acids, so that vigorous stirring is required throughout the reaction.

Rigid rod PBZ blocks prepared by the syntheses previously described will inherently be terminated at each end by azole-forming sites. Preferably, at least one azole-forming moiety is an o-amino-basic moiety; more preferably, both are o-amino-basic moieties. PBZ polymers terminated by o-amino-basic moieties can be synthesized in a manner familiar to persons skilled in the art by adding a slight excess of BB-monomer. PBZ polymers terminated by o-amino-basic moieties are preferably synthesized by the process illustrated in Formula 9

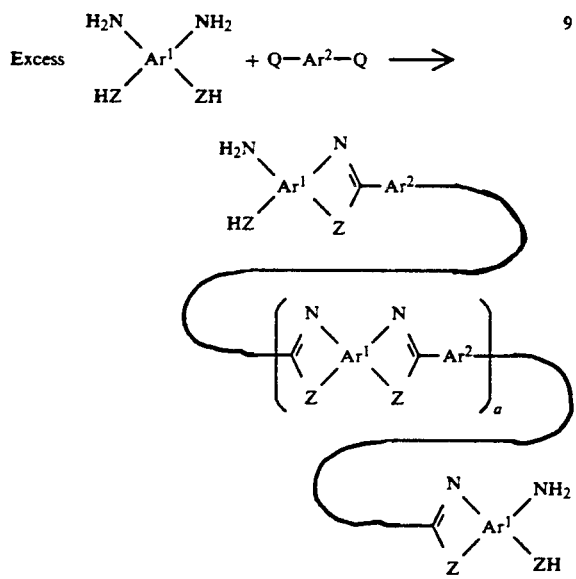

wherein a is a number of repeating units at least equal to 10 on average and all other characters have the limits and preferred embodiments previously assigned.

Thermoplastic PBZ Polymers

Certain non-rigid-rod PBZ polymers are thermoplastic. The reference K.-U. Bühler, *Spezialplaste* 838–866 (Akademie-Verlag 1978), which is incorporated herein by reference, reports in Table 158 from 844–854 the structures and synthesis of many PBZ polymers for which the reference also reports glass transition temperatures. Block copolymers of the present invention contain blocks of thermoplastic PBZ polymer. Thermoplastic PBZ polymer blocks preferably are taken from one or both of two species.

The first species of thermoplastic PBZ polymer, hereinafter referred to as jointed PBZ, contains a plurality of mer units, each of which comprises (1) a first AB-PBZ moiety having an aromatic group ($Ar^3$) and a single azole ring fused with said aromatic group;

(2) a second AB-PBZ moiety independently having a description similar to the first AB-PBZ moiety;

(3) a bond or a first divalent linking moiety (X), which is inert with respect to PBZ monomers and polymerization reagents under PBZ polymerization conditions, bonded to the aromatic group in each of the first and second AB-PBZ moieties; and (4) a non-linear group (L) bonded to the 2-carbon in the azole ring of the second AB-PBZ moiety and to the 2-carbon in the azole ring of the first AB-PBZ moiety of an adjacent mer unit, which non-linear group is not substantially rectilinear and is inert with respect to PBZ monomers and polymerization reagents under PBZ polymerization conditions.

Each non-linear group (L) may comprise a meta-aromatic group ($Ar^m$), such as an m-phenylene moiety, an m-pyridinylene moiety, a 3,4'-biphenylene moiety, a 4,3'-biphenylene moiety, a 3,3'-biphenylene moiety or a 2,6-naphthalene moiety. Alternatively, each non-linear group (L) may contain an aliphatic moiety wherein the azole rings are bonded to the same carbon atom or adjacent carbon atoms in the aliphatic moiety. Alternatively and preferably, each non-linear group (L) comprises two aromatic groups (Ar) linked by a second divalent linking moiety (X'). Aromatic groups conform to the descriptions and preferred embodiments previously defined for aromatic groups.

The first and second divalent linking moieties (X and X') preferably independently comprise a sulfonyl moiety, an oxygen atom, a sulfur atom or an aliphatic group and more preferably comprise either a sulfonyl moiety or an oxygen moiety. More highly preferably, the first divalent linking moiety (X) comprises a sulfonyl moiety and the second divalent linking moiety (X') comprises an oxygen atom. Most preferably, the first divalent linking moiety is a sulfonyl moiety and the second divalent linking moiety is an oxygen atom. It is within the scope of the present invention for either or both divalent linking moieties to comprise two oxygen atoms, sulfur atoms, sulfonyl moieties or aliphatic moieties linked by a aromatic group.

When the non-linear group (L) comprises an aliphatic group, it preferably comprises no more than about 12 carbon atoms. The aliphatic group may be cyclic or branched. It is preferably alkyl or halogenated alkyl. Examples of suitable aliphatic groups include a 1,2-cyclohexyl moiety and a perfluoroisopropylidene moiety. As previously described, in jointed PBZ the bonds to the aliphatic moiety are preferably to the same carbon atom or an adjacent carbon atom. Thermoplastic PBZ polymers in which the non-linear group is aliphatic and the bonds from the azole rings are not to the same or adjacent carbons are not outside the scope of the present invention, but are more appropriately considered as "aliphatic PBZ polymers," the second species of thermoplastic PBZ.

Due to the high glass transition temperatures of jointed PBZ polymers, aliphatic moieties within jointed PBZ polymers are preferably perfluorinated, such as perfluoroisopropylidene, to add temperature stability. Synthesis of PBZ polymers containing perfluorinated aliphatic groups is described in Maruyama et al., "Synthesis and Properties of Fluorine-Containing Aromatic Polybenzoxazoles from Bis(o-aminophenols) and Aromatic Diacid Chlorides by the Silylation Method," 21(8) *Macromolecules* 2305 (1988), which is incorporated herein by reference.

AB-PBZ moieties within the thermoplastic PBZ blocks preferably conform to Formula 10(a)

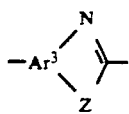

(10a)

and more preferably conform to either Formula 10(b) or 10(c).

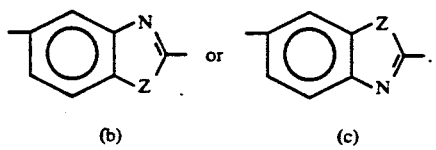

(b)      (c)

Mer units for jointed PBZ polymer preferably comply with Formula 11

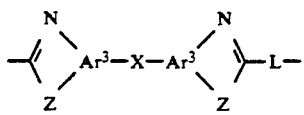

(11)

wherein:
X is a bond or the first divalent linking moiety as previously defined;
each $Ar^3$ is an aromatic group as previously defined;
L is a non-linear group as previously defined; and
all other characters have the meanings previously assigned.

When L comprises an m-aromatic group ($Ar^m$), it may be, for example, one of the groups set out in Formula 12(a)–(d)

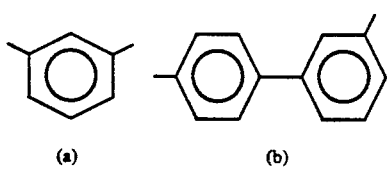

(a)      (b)

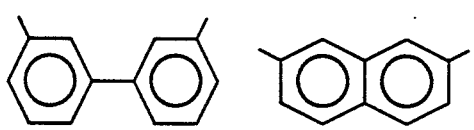

(c)      (d)

or a substituted or heterocyclic variation thereof, such as an m-pyrimidinyl moiety.

When L comprises two aromatic groups joined by a second divalent linking moiety, it preferably conforms to Formula 13

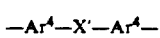

(13)

wherein X' is a second divalent linking moiety. Bonds to each $Ar^4$ are preferably in meta or para position with respect to each other and more preferably in para position.

X and X' preferably independently conform to Formula 14(a) or (b)

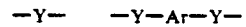

(14)

(a)      (b)

wherein each Y is independently a sulfonyl moiety, an oxygen atom, a sulfur atom or an aliphatic moiety. Each Y is preferably a sulfonyl moiety or an oxygen atom.

Mer units in jointed PBZ more preferably comply with Formula 15(a)

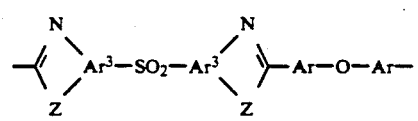

(15a)

and most preferably conform with the Formula 15(b)

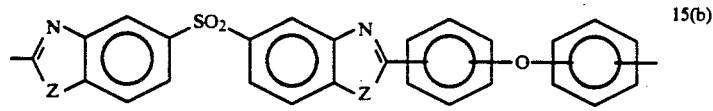

(15b)

or the variation thereof wherein the sulfonyl group is bonded to the AB-PBZ moieties meta to the Z groups and para to the nitrogen atoms.

Jointed PBZ blocks are preferably synthesized by the reaction of appropriate monomers under known conditions such as those described in U.S. Pat. Nos. 4,772,678 and 4,533,693 which are incorporated herein by reference. The synthesis comprises the step of contacting a BB-monomer having:

(a) a first aromatic group and a second aromatic group;
(b) a bond or a first divalent linking moiety (X) as previously described linking said first and second aromatic groups; and
(c) a first o-amino-basic moiety bonded to the first aromatic group and a second o-amino-basic moiety bonded to the second aromatic group, and an AA-monomer having:

(a) a non-linear group (L) as previously described; and
(b) a first and a second electron-deficient carbon group bonded to the non-linear aromatic group in a mineral acid in proportions and under conditions such that the thermoplastic PBZ polymer is formed.

The BB-monomer preferably conforms to Formula

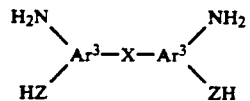

(16)

wherein all characters have the definition previously given. Examples of suitable BB-monomers and processes for their synthesis are found in U.S. Pat. No. 4,533,693, Table III, Column 23, line 21 to Column 24, line 30, monomers 1q–1x, which is incorporated herein by reference. AA-monomers preferably conform to one of formulae 17(a)–(e)

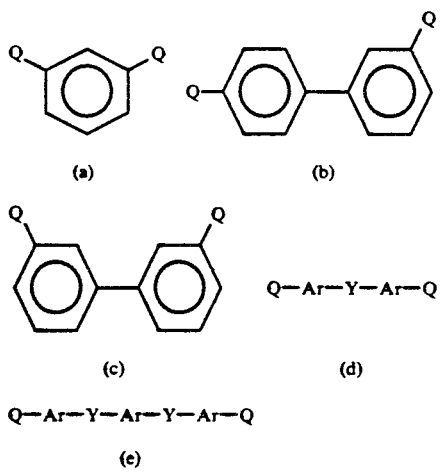

(a)  (b)  (c)  (d)

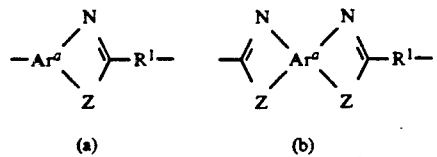

Q—Ar—Y—Ar—Y—Ar—Q (e)

wherein Q is an electron-deficient carbon group as previously defined and all other characters have the meanings previously given. Examples of preferred AA-monomers are found in U.S. Pat. No. 4,533,693, Table VI at Column 30, line 40 to Column 32, line 20, monomers 2kk to 2uu, and obvious derivatives thereof. Other examples of second monomers useful for the practice of the present invention are oxy-bis-(benzoyl chloride), sulfonyl bis-(benzoyl chloride), sulfonyl bis-(benzoic acid), isophthaloyl chloride, and 4,3'-bis-(benzoic acid) or 4,3'-bis-(benzoyl chloride).

Process conditions and preferred conditions for synthesizing jointed PBZ polymer are similar to those for synthesizing rigid rod PBZ polymers. The solvent is preferably a mineral acid and is more preferably polyphosphoric acid or methanesulfonic acid. Preferred temperature conditions are those already described for synthesizing rigid rod PBZ polymers. The synthesis is preferably practiced under inert atmosphere. The monomers are preferably reacted in about equimolar proportions. Substantial deviations from equimolar proportions will provide polymers having a short chain length in a manner familiar to persons skilled in the art of condensation polymer chemistry.

Concentrations of monomers in synthesizing jointed PBZ blocks are preferably somewhat lower than concentrations used to synthesize rigid rod PBZ blocks, because otherwise the viscosity of the reaction mixture becomes very high during polymerization. The concentration of monomer is preferably no more than about 15 percent by weight and more preferably no more than about 8 percent by weight.

A second species of thermoplastic PBZ polymer, hereinafter referred to as "aliphatic PBZ," contains a plurality of mer units each of which comprises (1) an aromatic group ($Ar^a$) as that term is previously defined;
(2) a first azole ring fused to said aromatic group; and
(3) an aliphatic group ($R^1$) having at least 3 carbon atoms bonded to the 2 carbon of said first azole ring.

Each mer unit preferably further contains:

(4) a second azole ring fused to said aromatic group ($Ar^a$).

Mer units comprising only one azole ring (aliphatic AB-PBZ) are linked by a bond from the aliphatic group ($R^1$) of one mer unit to the aromatic group ($Ar^a$) of an adjacent mer unit. Mer units containing two azole rings (aliphatic AA/BB-PBZ) are linked by a bond from the aliphatic group ($R^1$) of one mer unit to the 2-carbon of the second azole ring of an adjacent mer unit. Within the aliphatic group ($R^1$), aromatic groups and/or azole rings should not be bonded to the same carbon atom or to adjacent carbon atoms, i.e., the first azole ring of one mer unit should be bonded to the aliphatic group in at least Y position with respect to the aromatic group or second azole ring of the adjacent mer unit.

Mer units within aliphatic PBZ polymers preferably comply with one of formulae 18(a) and (b)

$$-Ar^a\underset{Z}{\overset{N}{\diagup\diagdown}}R^1- \qquad -\underset{Z}{\overset{N}{\diagup\diagdown}}Ar^a\underset{Z}{\overset{N}{\diagup\diagdown}}R^1-$$

(a)  (b)

wherein $Ar^a$ is the aromatic group as previously described, $R^1$ is the aliphatic group as previously described and all other character have the meanings previously assigned.

The aromatic group ($Ar^a$) has the meaning and preferred embodiments previously given for aromatic groups. It may optionally comprise two aromatic groups linked by a divalent linking moiety (X), as that term is previously defined.

The size of the aliphatic group ($R^1$) is not critical as long as the group comprises at least 3 carbon atoms and is small enough that it can be synthesized and reacted. The aliphatic group preferably comprises no more than about 12 carbon atoms, more preferably no more than about 10 carbon atoms and most preferably no more than about 8 carbon atoms. It may be cyclic or branched. Neither variation is critical. Unbranched monomers are preferred because they are readily available. The aliphatic group may be fluorinated for better thermal stability. The aliphatic group is highly preferably alkyl or perfluoroalkyl.

Aliphatic AB-PBZ polymer blocks can be synthesized by known processes, such as by (1) formation of the corresponding amide in a system of triphenyl phosphine, hexachloroethane and pyridine and (2) thermal cyclization of the amide, as described in Mathias et al., "Two-Step Synthesis of Alkyl- and Alkenylbenzoxazole Polymers," 18 *Macromolecules* 616 (1985).

Aliphatic AA/BB-PBZ polymer blocks are synthesized by known methods, such as the reaction of a BB-monomer containing an aromatic group bonded to two o-amino-basic moieties with an AA-monomer comprising an aliphatic group having 3 carbon atoms and bonded to 2 electron-deficient carbon groups. Suitable BB-monomers are familiar to persons of ordinary skill in the art, and are illustrated in U.S. Pat. No. 4,533,693, Column 19, line 53 to Column 24, line 48, which is incorporated herein by reference. Suitable AA-monomers are found in U.S. Pat. No. 4,533,693 at Column 26, lines 10-35 (monomers 2e-2h) and Column 32, lines 30-48 (monomers 2ww-2zz), which is incorporated herein by reference. For example, suitable AA-monomers may be glutaric acid, adipic acid, pimelic acid, sebacic acid, subaric acid, the acid halides thereof or glutaronitrile.

The conditions for the reaction and the ratio of first and second monomers are identical to those previously given for synthesizing rigid rod PBZ polymer and jointed PBZ polymer.

The thermoplastic PBZ blocks comprise a plurality of mer units. Each preferably comprises by number average at least about 5 mer units, more preferably at least about 10 mer units, and most preferably at least about 25 mer units. If synthesized as a homopolymer before incorporation into the block copolymer, thermoplastic AA/BB-PBZ blocks are preferably terminated by the same end group, either an electron-deficient carbon group or an o-amino-basic group, at each end.

Block Copolymers of the Present Invention

Rigid rod PBZ blocks and thermoplastic PBZ blocks are linked together in block copolymers, such as diblock, triblock and multiblock copolymer compositions. The terms block copolymer, diblock, triblock and multiblock are well-known in the art of polymer chemistry and have the definition given in 2 Ency. Poly. Sci. & Eng., *Block Copolymers*, 324-26 (John Wiley & Sons 1987), which is incorporated herein by reference.

Block copolymers comprise:
(1) a rigid rod PBZ block containing at least about 10 mer units; and
(2) a thermoplastic PBZ block bonded to said rigid rod block and containing at least a plurality of mer units.

The rigid rod and thermoplastic PBZ blocks have the descriptions and preferred embodiments previously given. It is theorized that block copolymers of the present invention are substantially linear, as opposed to being graft copolymers.

The weight proportions of the rigid rod PBZ blocks and thermoplastic PBZ blocks within the block copolymer may vary in any proportions from about 99 percent rigid rod PBZ to about 99 percent thermoplastic PBZ. As the proportions of rigid rod block decrease, the physical properties of the block copolymer processed under similar conditions become less like those of the rigid rod homopolymer and more like those of the thermoplastic homopolymer, in a manner familiar to persons skilled in the art of block copolymer chemistry The optimal weight ratio of each block depends upon the desired levels of strength and processability for the polymer. In most cases, however, the sum of the rigid rod blocks and the sum of the thermoplastic PBZ blocks each preferably make up, on average, at least about 5 percent of the weight of the block copolymer molecule, more preferably at least about 10 percent, more highly preferably, at least about 20 percent, and most preferably, at least about 30 percent.

Physical properties of the block copolymers are also dependent upon a number of other factors, such as the chemical structure of the rigid rod and thermoplastic blocks, the amount of homopolymer mixed in with the block copolymer, the additives mixed in with the block copolymer, the lengths of the rigid rod and thermoplastic blocks and the conditions under which the block copolymer is processed. Preferred block lengths and chemical structures are already set out in describing the rigid rod and thermoplastic polymers. If the rigid rod blocks are too long, the block copolymer may have a higher tendency to phase-separate.

Block copolymers of the present invention preferably comprise a moiety which complies with Formula 19

                                                        19 wherein
the block marked (rigid rod) represents a rigid rod PBZ polymer as previously described and illustrated;
the block marked (thermoplastic) represents a thermoplastic PBZ polymer as previously described and illustrated; and
c is a number of units equal to or greater than one.

The rigid rod PBZ block may comprise, for example, ten or more mer units illustrated in Formulae 2 or 5. The thermoplastic block may comprise, for example, a plurality of mer units illustrated in Formulae 11, 15 or 18. The block copolymers more preferably comprise a moiety which conforms with Formula 20(a) or (b) or (c):

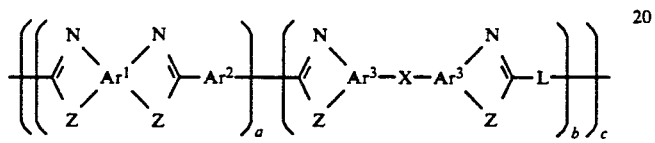

(a)

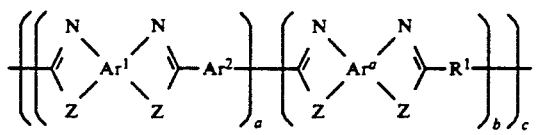

(b)

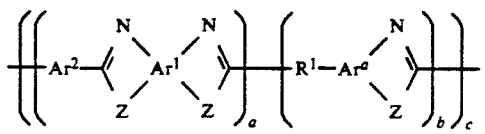

(c)

and most preferably comprise a moiety which complies with Formula 21

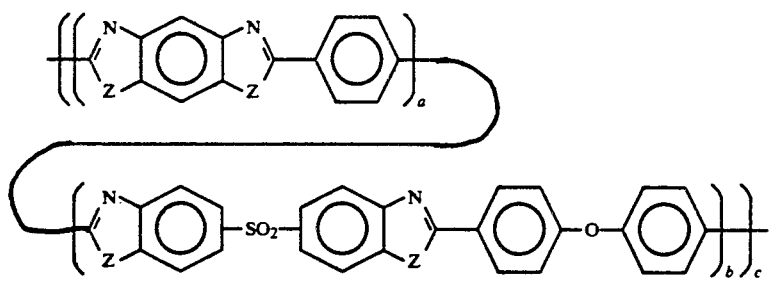

wherein a is a number of repeating rigid rod mer units, b is a number of repeating thermoplastic mer units, c is a number equal to at least 1, all other characters have the meanings and preferred embodiments previously described, and the sulfonyl group in Formula 28 is bonded to each AB-PBZ moiety para to either the nitrogen atom or the Z moiety.

The block copolymers of the present invention may contain variations obvious to persons of ordinary skill in the art. For instance, either a rigid rod block or a thermoplastic block may comprise a random copolymer containing mer units of at least two of PBO, PBI and/or PBT. Likewise, different rigid rod or thermoplastic blocks within the same block copolymer may have a different chemical make up, such as having one rigid rod block of PBO and another of PBT or having one thermoplastic block of jointed PBZ and another of aliphatic PBZ. Thermoplastic blocks may comprise both AA/BB-PBZ mer units and AB-PBZ mer units, although the levels of AB-PBZ in jointed PBZ should not be so high that the block copolymer is not thermoplastic. Thermoplastic blocks may comprise random copolymers of jointed and aliphatic PBZ.

Block copolymers are preferably synthesized in dopes with mineral acid either:

(1) by contacting a rigid rod PBZ polymer terminated by a first azole-forming group with a thermoplastic PBZ polymer terminated by a second azole-forming group capable of reacting with the first azole-forming group; or (2) by contacting a rigid rod PBZ polymer terminated by an azole-forming group with monomers appropriate to form a thermoplastic PBZ polymer; or (3) by contacting a thermoplastic PBZ polymer terminated by an azole-forming group with monomers appropriate to form a rigid rod PBZ polymer in a mineral acid under conditions such that a block copolymer is formed. Rigid rod PBZ polymers and thermoplastic PBZ polymers used in the reaction conform to the descriptions and preferred embodiments previously used to describe the rigid rod and thermoplastic blocks in the block copolymer. Each polymer used in the reaction is preferably terminated at each end by an azole-forming group.

The reaction is preferably between a polymer and monomers appropriate to form the other polymer. It is more preferably between a rigid rod PBZ polymer and monomers appropriate to form a thermoplastic PBZ polymer. The reactions of polymer with polymer are described in U.S. Pat. No. 4,533,693 at Columns 67-80 and 142-165, which is incorporated by reference.

The reaction of polymer with polymer or polymer with monomers proceeds under the same conditions previously described for synthesis of thermoplastic PBZ polymer. The weight ratios of polymer to polymer or polymer to monomer have the same limitations and preferred embodiments previously used to describe the weight ratio of rigid rod block to thermoplastic block within the block copolymer. If it is desired to shorten or control the molecular weight of the block copolymer, end-capping monomers such as benzoic acid and o-aminophenol can be added to the reaction mixture as described in U.S. Pat. No. 4,703,103, Column 41, line 25 to Column 47, line 15, which is incorporated herein by reference. The concentration of reagents in the mineral acid is preferably low enough that the resulting dope is in an optically isotropic (substantially non-liquid-crystalline) phase.

In polymer/polymer reactions, the molar ratio of rigid rod PBZ polymer to thermoplastic PBZ polymer is preferably about equimolar, although an excess of one polymer may be used to form triblock copolymers according to methods familiar to persons skilled in the art. Furthermore, if there is a molar excess of one polymer or if the rigid rod and thermoplastic polymers are each terminated by an identical azole-forming group, a monomer comprising two azole-forming groups capable of reacting with the azole-forming groups on the polymers may be added to adjust the stoichiometry. For instance, rigid rod and thermoplastic polymers terminated by o-amino-basic groups can be linked in the presence of an AA-monomer as previously described. The weight and molar ratios of the blocks can be adjusted in polymer/polymer reactions through control of the molecular weights of the various polymers in a manner readily apparent to persons skilled in the art.

The product of each method of synthesis is a dope comprising mineral acid and block copolymers of the present invention. Block copolymers within the composition are theorized to be ordinarily a mixture of diblock, triblock and/or multiblock copolymers whose average molecular weights and proportions vary, depending upon the reagents used and their relative proportions.

It is theorized that the dope ordinarily further comprises some thermoplastic PBZ homopolymer which is not linked to a rigid rod block and/or some rigid rod PBZ homopolymer polymer which is not linked to a thermoplastic block. Ordinarily it is preferred that the proportion of rigid rod PBZ polymers which are not part of block copolymers is minimized, and it is more preferred that the proportion of thermoplastic PBZ homopolymer which is not part of block copolymers is also minimized. However, for some uses it may be desirable to form a dope containing higher levels of homopolymer by obvious methods such as use of an endcapping agent or by adding homopolymer to the dope after the reaction is completed. Furthermore, one or more additives as described in U.S. Pat. No. 4,533,693 at Column 84, which is incorporated herein by reference, may be added to the dope for coloring, filler, antioxidants, etc. Upon precipitation from the mineral acid, the mixture of block copolymer and homopolymer and/or additives forms the polymer composition of the present invention.

The block copolymer and any homopolymer and/or additives in the dope are coagulated by diluting and/or hydrolyzing the mineral acid solvent and/or dissolvong it away from the polymer, for instance with water. Although the block copolymer may be synthesized in a dope having any concentration of polymer which is convenient, it should be coagulated from a dope which is in an optically isotropic (substantially non-liquid-crystalline) phase. The phase is important because block copolymers precipitated from optically anisotropic dopes form phase-separated polymers. Phase-separation in precipitated polymers can not be reversed except by redissolving the polymer and precipitating from an optically isotropic solution.

Optical isotropy and anisotropy of the dope can be determined by a number of tests familiar to persons of ordinary skill in the art, such as those described in Hwang et al., "Composites on a Molecular Level: Phase Relationships, Processing, and Properties," B22(2) J. Macromol. Sci.-Phys. 231, 234-35 (1983), which is incorporated by reference. A simple method is to see if the solution exhibits birefringence when viewed under a microscope under cross-polar conditions. Within even optically isotropic solutions, some association of rigid rod blocks is inevitable on a molecular scale. However, in polymers precipitated from the optically isotropic phase the level of phase-separation is small enough to provide a block copolymer or polymer composition which is essentially a molecular composite.

The point at which a given dope changes from optically isotropic to anisotropic phase and and the reverse varies as a function of many factors, such as the concentration of the polymer, the solvent, the size and concentration of rigid rod blocks within the polymers in the dope, the temperature of the dope and other factors. The parameter most easily controlled is concentration of the block polymer and any homopolymer. As previously described, it is convenient to synthesize the block copolymer in a solution having a low enough concentration to avoid the anisotropic phase. If an anisotropic dope is formed, it may be diluted with mineral acid until an optically isotropic state is reached.

The preferred concentration of polymer in optically isotropic dopes of the present invention varies depending upon the portion of the polymer which is rigid rod. If the polymer in the dope contains only about 5 weight percent rigid rod or less, then the concentration of polymer in the dope may be as high as the mineral acid can dissolve, such as at most about 15 weight percent. If the polymer contains about 30 weight percent rigid rod, then the dope preferably comprises no more than about 12 weight percent polymer, more preferably no more than about 10 percent. If the polymer contains about 50 weight percent rigid rod, then the dope preferably comprises no more than about 8 weight percent polymer, more preferably no more than about 7 weight percent. If the polymer comprises about 70 weight percent rigid rod, then the dope preferably comprises no more than about 6 weight percent polymer and more preferably no more than about 4 weight percent polymer.

If the dope is to be extruded to form shaped products as described hereinafter, then it must contain sufficient polymer to be processable, i.e. to form the desired product consistently. The dope preferably contains at least about 0.05 percent polymer by weight, more preferably at least about 1 percent, more highly preferably at least about 2 percent and most preferably at least about 3 percent.

Block copolymers and polymer compositions precipitated from optically isotropic dopes are substantially non-phase-separated. As with the dopes, some slight phase-separation on a molecular level is inevitable. However, the domains of phase-separated polymer in the polymer compositions of the present invention should be on average not greater than about 1000 angstroms, preferably not greater than about 500 angstroms, more preferably not greater than about 200 angstroms, more highly preferably not greater than about 100 angstroms and most preferably not greater than about 50 angstroms.

The non-phase-separated polymers and compositions of the present invention preferably do not exhibit physical characteristics of phase-separated systems, such as opacity, small-angle X-ray scattering or small-angle light scattering. Methods for measuring phase-separation in a system are discussed in Hwang et al., "Composites on a Molecular Level: Phase Relationships, Processing, and Properties," B22(2) J. Macromol. Sci.-Phys. 231, 234-35 (1983), which is incorporated by reference.

Fabrication and Physical Properties of Items Using Polymer Compositions of the Present Invention Optically isotropic dopes of the present invention can be coagulated to produce useful into fibers and films according to known processes. The dope is preferably first degassed under elevated temperature and/or reduced pressure, such as about 80° C. and about 0.4 in Hg.

Fibers are spun and films are extruded by known techniques familiar to persons of ordinary skill in the art. See, e.g., Chenevey et al., *Process for Preparing Shaped Articles of Rigid Rod Heterocyclic Liquid Crystalline Polymers*, U.S. Pat. No. 4,606,875 (Aug. 19, 1986): Tan, *Process for Producing High-Strength, Ultra-low Denier Polybenzimidazole (PBI) Filaments*, U.S. Pat. No. 4,263,245 (April 21, 1981); U.S. Pat. No. 4,533,693 at column 82-84; 11 Ency. Poly. Sci & Eng., supra, at 625-630; Hwang et al., "Solution Processing and Properties of Molecular Composite Fibers and Films," 23 Poly. Eng. & Sci. 784, 785 (1984); and Hwang et al., "Composites on a Molecular Level: Phase Relationships, Processing, and Properties," B22(2) J. Macromol. Sci.-Phys. 231, 234-35 (1983), which are incorporated by reference.

Fibers are formed by a dry jet-wet spinning process in which dope is extruded through a spinnerette and falls through an air gap into a bath which dilutes the acid in the dope and coagulates the spun fiber. Films are formed by extruding the dope through a flat die onto a rotating drum which rotates the film through a bath which dilutes and/or hydrolyzes the acid and coagulates the film. In each case, the coagulation bath is preferably water. Fibers are preferably stretched immediately after coagulation and may be heat treated under tension according to known process. Coagulated block copolymer and polymer compositions should be rinsed thoroughly to remove as much trapped mineral acid as is feasible. Films may also be formed by blow-molding the dope and then contacting it with a coagulating bath.

Different dopes extrude with different optimal processing parameters, which can easily be ascertained by experimentation with particular dopes.

The physical properties of fibers and films of the present invention vary depending upon the molecular weights and chemical compositions of the polymers therein and upon the conditions under which those articles are processed. Ordinarily, articles comprising a higher rigid rod content will have higher tensile strength and tensile modulus than articles formed under equivalent processing conditions from polymers of similar molecular weight but having a lower rigid rod content.

Polymer compositions and block copolymers of the present invention and articles formed from them are thermoplastic, although the glass-transition temperature varies substantially depending upon the chemical composition and weight ratios of the block copolymer and the polymer composition. Block copolymers and compositions comprising jointed PBZ blocks frequently have a glass-transition temperature above about 300° C., 325° C., 350° C. or even 400° C. The glass-transition temperature is preferably no higher than about 500° C., and more preferably no higher than about 450° C.

Block copolymers and compositions comprising aliphatic PBZ blocks ordinarily have a glass-transition temperature substantially lower than block copolymers containing jointed PBZ. The glass-transition temperature should be below the decomposition temperature of the block copolymer or polymer composition. It is preferably no more than about 250° C., more preferably no more than about 200° C., and most preferably no more than about about 175° C.

If extruded from a dope in the optically isotropic phase, block copolymer, polymer compositions and articles made from them are not substantially phase-separated and do not experience substantial phase-separation even upon heating up to their glass-transition temperature. They more preferably do not experience substantial phase-separation when heated to at least about 25° C. beyond their glass-transition temperature. However, fibers and films, particularly heat-treated fibers, may suffer some loss of tensile strength and modulus if heated for long periods above their glass-transition temperature without tension.

Films can be fabricated into laminates by compression molding above the glass-transition temperature of the block copolymer or polymer composition in the film. Laminates can be used to make objects by known methods, such as compression molding at a temperature above the glass-transition temperature of the film. Furthermore, powders of the polymer composition can be compression molded by known techniques at a temperature above the glass-transition temperature of the polymer to make useful articles. Powders can be made by precipitating the polymer dope in a blender, washing out any remaining acid, drying the product and grinding the resulting product in a grinder. Fibers can be incorporated into thermosetting matrix composites as described in 11 Ency. Poly. Sci. & Eng., supra, at 630-31.

ILLUSTRATIVE EMBODIMENTS

The following examples are given to illustrate the invention and should not be interpreted as limiting it in any way. Unless stated otherwise, all parts and percentages are given by weight.

Preliminary Synthesis of Polymers/Oligomers

EXAMPLE A

Synthesis of dope comprising cis-polybenzoxazole in polyphosphoric acid. (Not an Example of the Invention)

In the amounts shown hereinafter in Table I, 4,6-diaminoresorcinol dihydrochloride (DAHB) and terephthaloyl chloride (TC) are mixed in polyphosphoric acid (PPA) containing about 76 percent phosphorous pentoxide by weight under nitrogen atmosphere. The mixture is agitated vigorously and heated for 16 hours at 45° C. The temperature is raised to 95° C. and additional phosphorous pentoxide is added as shown in Table I. The reaction is continued with stirring for 8 hours at 95° C., for 16 hours at 150° C. and for 24 hours at 190° C. The resulting dopes are stored sealed under nitrogen atmosphere until needed. The polymers synthesized comprise repeating units as illustrated in Formula 14(a) predominantly terminated by o-amino-basic moieties as illustrated in Formula 16 wherein Z is an oxygen atom.

To measure inherent viscosity ($\eta$), a small quantity of polymer is isolated by coagulating a portion of the polymer in water, drying the polymer, grinding it to a fine powder, extracting impurities with water and drying under temperatures of about 170° C. and pressures of about 3 mm Hg. The isolated polymer is dissolved at room temperature in methanesulfonic acid in a concentration of about 0.05 g/dL. The inherent viscosity of the resulting solution at 25° C. is measured in a Schott-Gerate CT 150 bath in an Ubelhobde tube.

TABLE I

| Sample | DAHB (g) | DAHB (mmole) | TC (g) | T (mmole") | PPA (g) | $P_2O_5$ Added (g) | $\eta$ (dL/g) |
|---|---|---|---|---|---|---|---|
| 1 | 100.00 | 469.4 | 90.52 | 445.9 | 414.4 | 244.2 | 5.08 |
| 2 | 50.00 | 234.7 | 46.57 | 229.4 | 201.5 | 124.8 | 9.53 |
| 3 | 100.00 | 469.4 | 90.52 | 445.9 | 411.0 | 247.6 | 6.25 |
| 4 | 50.00 | 234.7 | 45.26 | 222.9 | 206.0 | 116.8 | 5.27 |
| 5 | 80.00 | 375.5 | 72.42 | 356.7 | 326.9 | 189.6 | 5.60 |
| 6 | 50.00 | 234.7 | 43.37 | 313.6 | 200.0 | 117.7 | 3.58 |
| 7 | 50.00 | 234.7 | 46.57 | 229.4 | 204.3 | 122.0 | 10.50 |

EXAMPLE B

Synthesis of thermoplastic PBO dope. (Not an Example of the Invention)

In the amounts shown below in Table 2, 3,3'-diamino-4,4'-dihydroxy-diphenylsulfone (DADHS) and oxy-bis-(benzoyl chloride) (OBBC) are mixed in polyphosphoric acid (PPA) containing about 76 percent phosphorous pentoxide by weight under nitrogen atmosphere. The mixture is stirred vigorously and heated for 16 hours at 45° C. The temperature is raised to 95° C. and additional phosphorous pentoxide is added as shown in Table 1. The reaction is continued with stirring for 8 hours at 95° C., for 16 hours at 150° C. and for 24 hours at 190° C. The resulting dopes are stored sealed under nitrogen atmosphere until needed. The polymers synthesized comprise repeating units as illustrated in Formula 27(b) wherein Z is an oxygen atom and are predominantly terminated by benzoyl chloride moieties or o-aminophenolic moieties.

To measure inherent viscosity ($\eta$), the polymer is isolated by coagulating a portion of the polymer in water, drying the polymer, grinding it to a fine powder, extracting impurities with water and drying under temperatures of about 100° C. and pressures of about 3 mm Hg. The isolated polymer is dissolved at room temperature in concentrated sulfuric acid in a concentration of about 0.5 g/dL. The inherent viscosity of the resulting solution at 25° C. is measured in a Schott-Gerate CT 150 bath in an Ubelhobde tube.

TABLE II

| Sample | DADHS (g) | DADHS (mmole) | OBBC (g) | OBBC (mmole) | PPA (g) | $P_2O_5$ Added (g) | $\eta$ (dL/g) |
|---|---|---|---|---|---|---|---|
| 1 | 6.00 | 16.20 | 4.89 | 16.60 | 48.0 | 39.0 | 2.76 |
| 2 | 6.00 | 16.20 | 4.65 | 15.80 | 46.8 | 38.1 | 0.65 |
| 3 | 6.00 | 16.20 | 5.01 | 17.00 | 48.3 | 39.9 | 1.55 |
| 4 | 6.00 | 16.20 | 5.01 | 17.00 | 48.3 | 39.9 | 2.32 |
| 5 | 24.52 | 66.05 | 19.00 | 64.38 | 190.0 | 157.2 | 1.41 |
| 6 | 11.32 | 30.50 | 8.00 | 27.10 | 53.4 | 44.8 | 0.322 |
| 7 | 9.43 | 25.40 | 6.98 | 23.70 | 56.8 | 45.7 | 0.495 |
| 8 | 9.43 | 25.40 | 6.98 | 23.70 | 56.5 | 45.9 | 0.45 |

Different sources of OBBC were used for synthesizing Samples 3 and 4

EXAMPLE 1

Synthesis of 30% rigid rod PBO/70% jointed PBO block copolymer by reaction of rigid rod PBO polymer and monomers for jointed PBO Under nitrogen atmosphere, 3.72 g (10.0 mmol) of 3,3'-diamino-4,4'-dihydroxydiphenylsulfone dihydrochloride monohydrate and 3.08 g (10.4 mmol) of 4,4'-oxybis(benzoyl chloride) are added to 83.1 g of polyphosphoric acid containing 76.2 weight percent $P_2O_5$. Stirring and nitrogen atmosphere are continued throughout the reaction. The mixture is heated for 16 hr at 45° C. 36 g of $P_2O_5$ is added and the temperature is raised to 95° C. for 8 hr. 14.29 g of dope from Example A(1) is added and the reaction is continued for 16 hr at 95° C. The temperature is raised to 150° C. and 28.3 g of $P_2O_5$ is added. The reaction is continued for 24 hr at 150° C. and for 24 hr at 190° C. It yields an almost unstirrable clear green rubbery dope.

A small portion of dope is coagulated with water, neutralized with aqueous sodium hydroxide, soaked and washed with water, dried, ground, resoaked with water and dried to a constant weight. The powder is dissolved in methanesulfonic acid (1.5 weight percent solution) and cast as a clear thin film, which welds together when heated while folded over, but retains its clarity and strength. The precipitated polymer is dissolved at room temperature in methanesulfonic acid overnight, and viscosity is measured at 25° C. and a concentration of 0.5 g/dL in a Schott-Gerate CT 150 using an Ubelhobde tube. The polymer has an inherent viscosity of 23.7 dL/g.

EXAMPLE 2

Synthesis of 50% rigid rod PBO/50% jointed PBO block copolymer by reaction of jointed PBO polymer and monomers for rigid rod PBO Under nitrogen atmosphere, 2.55 g (12.0 mmol) of 4,6-diaminoresorcinol dihydrochloride and 2.51 g (12.4 mmol) of terephthaloyl chloride are added to 91.7 g of polyphosphoric acid containing 76.7 weight percent $P_2O_5$. Stirring and nitrogen atmosphere are continued throughout the reaction. The mixture is heated for 16 hr at 45° C. The temperature is raised to 95° C. 63.6 g of $P_2O_5$ is added, and then 28.0 g of dope from Example B(7) is added. The reaction is continued for 8 hr at 95° C. The reaction is continued for 16 hr at 150° C. and for 24 hr at 190° C. It yields a rubbery lemon-yellow dope.

A sample of the polymer is precipitated with water and isolated as described in Example 1. Inherent viscosity of the polymer is measured as described in Example 1 and is about 15.8 dL/g.

EXAMPLE 3

Synthesis of 50% rigid rod PBO/50% jointed PBO block copolymer by reaction of jointed PBO polymer and monomers for rigid rod PBO Under nitrogen atmosphere, 2.30 g (10.8 mmol) of 4,6-diaminoresorcinol dihydrochloride and 2.26 g (11.1 mmol) of terephthaloyl chloride are added to 82.2 g of polyphosphoric acid containing 76.6 weight percent $P_2O_5$. Stirring and nitrogen atmosphere are continued throughout the reaction. The mixture is heated for 16 hr at 45° C. The temperature is raised to 95° C., and 57.7 g of $P_2O_5$ is added. The reaction is continued for 4 hr at 95° C., and then 25.20 g of dope from Example B(7) is added. The reaction is continued for 20 hr at 95° C. The reaction is continued for 24 hr at 150° C. and for 24 hr at 190° C. A sample of the polymer is precipitated with water and isolated as described in Example 1. Inherent viscosity of the polymer is measured as described in Example 1 and is about 16.3 dL/g.

EXAMPLE 4

Synthesis of 30% rigid rod PBO/70% jointed PBO block copolymer by reaction of jointed PBO polymer and rigid rod PBO polymer Under nitrogen atmosphere, 7.84 g of cis-PBO dope from Example A(3) and 20.9 g of dope from Example B(6) are mixed with 59.0 g of a solution containing 10 parts methanesulfonic acid to 1 part $P_2O_5$ by weight. Stirring and nitrogen atmosphere are continued throughout the reaction. The mixture is heated for 16 hr at 90° C. The temperature is lowered to 70° C., and 0.26 g of 4,4'-oxybis(benzoyl chloride) is added with an additional 5.3 g of methanesulfonic acid solution. The reaction is continued for 4 hr at 70° C. and for 48 hr at 90° C. A sample of the polymer is precipitated with water and isolated as described in Example 1. Inherent viscosity of the polymer is measured as described in Example 1 and is about 6.16 dL/g.

EXAMPLE 5

Synthesis of rigid rod PBO/jointed PBO (containing m-phenylene moiety) block copolymer by reaction of rigid rod PBO polymer and monomers for jointed PBO Under nitrogen atmosphere, 3.89 g (10.5 mmol) of 3,3'-diamino-4,4'-dihydroxydiphenylsulfone dihydrochloride monohydrate and 1.80 g (10.8 mmol) of isophthalic acid are added to 97.0 g of polyphosphoric acid containing 76.7 weight percent $P_2O_5$. Stirring and nitrogen atmosphere are continued throughout the reaction. The mixture is heated for 16 hr at 45° C. The temperature is raised to 95° C., 72.8 g of $P_2O_5$ is added, and the reaction is continued at 95° C. for 8 hr. 12.20 g of dope from Example A(3) is added and the reaction is continued for 16 hr at 95° C. The reaction is continued for 8 hr at 150° C. and for 16 hr at 190° C. A sample of composition containing block copolymer is precipitated and the inherent viscosity is measured as describe in Example 1. The inherent viscosity of the polymer is 7.0 dL/g.

EXAMPLE 6

Synthesis of 50% rigid rod PBO/50% jointed PBO block copolymer by reaction of PBO polymer and monomers for jointed PBO Under nitrogen atmosphere, 2.10 g (5.65 mmol) of 3,3'diamino-4,4'dihydroxydiphenylsulfone dihydrochloride monohydrate and 1.85 g (6.27 mmol) of 4,4'-oxybis-(benzoyl chloride) are mixed with 94.4 g of polyphosphoric acid containing about 76.6 weight percent $P_2O_5$. Stirring and nitrogen atmosphere are continued throughout the reaction. The mixture is heated for 16 hr at 45° C. The temperature is raised to 95° C., and 34.5 g of $P_2O_5$ is added. The reaction is continued for 8 hr at 95° C. and then 20.0 g of dope from Example A(4) is added. The reaction is continued for 16 hr at 95° C. The mixture is heated to 150° C. and 34.5 g of $P_2O_5$ is added. The reaction is continued at 150° C. for 24 hr and at 190° C. for 24 hr. A sample of polymer is precipitated with water and isolated as described in Example 1. The inherent viscosity of the polymer is measured as described in Example 1 and is about 21.1 dL/g.

EXAMPLE 7

Synthesis of 50% rigid rod PBO/50% jointed PBO block copolymer by reaction of PBO polymer and monomers for jointed PBO Under nitrogen atmosphere, 7.96 g (21.4 mmol) of 3,3'diamino-4,4'dihydroxydiphenylsulfone dihydrochloride monohydrate and 6.97 g (23.6 mmol) of 4,4'oxybis-(benzoyl chloride) are mixed with 347.2 g of polyphosphoric acid containing about 76.8 weight percent $P_2O_5$. Stirring under nitrogen atmosphere or vacuum are continued throughout the reaction. The mixture is heated for 16 hr at 45° C. The temperature is raised to 95° C., and 246.4 g of $P_2O_5$ is added. The reaction is continued for 1 hr with an exotherm raising the temperature to 115° C. The reaction is continued for 3 hr at 150° C., and then the mixture is degassed for ½ hr at about 5 mmHg. The mixture is transferred to a second reactor with a 92.86 weight percent transfer occurring. 69.7 g of dope from Example A(5) is added at 150° C. The reaction is continued at 150° C. for 2 hr and at 190° C. for 16 hr. The resulting dope is diluted by adding 596 g of polyphosphoric acid containing about 82 weight percent $P_2O_5$ and mixing for 4 hr. A sample of polymer is precipitated with water and isolated as described in Example 1. The inherent viscosity of the polymer is measured as described in Example 1 and is about 19.3 dL/g.

EXAMPLE 8

Synthesis of 70% rigid rod PBO/30% jointed PBO block copolymer by reaction of PBO polymer and monomers for jointed PBO Under nitrogen atmosphere, 1.40 g (3.76 mmol) of 3,3'diamino-4,4'dihydroxydiphenylsulfone dihydrochloride monohydrate and 1.36 g (4.62 mmol) of 4,4'-oxybis-(benzoyl chloride) are mixed with 103.7 g of polyphosphoric acid containing about 77.1 weight percent $P_2O_5$. Stirring and nitrogen atmosphere are continued throughout the reaction. The mixture is heated for 16 hr at 45° C. The temperature is raised to 95° C., and 26.6 g of $P_2O_5$ is added. The reaction is continued for 6 hr at 95° C. and then 28.0 g of dope from Example A(4) is added. The reaction is continued for 16 hr at 95° C. The mixture is heated to 150° C. and 26.6 g of $P_2O_5$ is added. The reaction is continued at 150° C. for 8 hr and at 190° C. for 16 hr. A sample of polymer is precipitated with water and isolated as described in Example 1. The inherent viscosity of the polymer is measured as described in Example 1 and is about 25.0 dL/g.

EXAMPLE 9

Synthesis of 50% rigid rod PBO/50% jointed PBO block copolymer by reaction of PBO polymer and monomers for jointed PBO Under nitrogen atmosphere, 1.51 g (4.07 mmol) of 3,3'diamino-4,4'dihydroxydiphenylsulfone dihydrochloride monohydrate and 1.43 g (4.83 mmol) of 4,4'-oxybis-(benzoyl chloride) are mixed with 114.3 g of polyphosphoric acid containing about 76.7 weight percent $P_2O_5$. Stirring and nitrogen atmosphere are continued throughout the reaction. The mixture is heated for 16 hr at 45° C. The temperature is raised to 95° C., and 60.0 of $P_2O_5$ is added. The reaction is continued for 6 hr at 95° C. and then 13.6 g of dope from Example A(6) is added. The reaction is continued for 16 hr at 95° C. The reaction is continued at 150° C. for 8 hr and at 190° C. for 24 hr. A sample of polymer is precipitated with water and isolated as described in Example 1. The inherent viscosity of the polymer is measured as described in Example 1 and is about 11.5 dL/g.

EXAMPLE 10

Synthesis of rigid rod PBO/aliphatic PBO block copolymer by reaction of rigid rod polymer with monomers for aliphatic PBO Under nitrogen atmosphere 2.21 g (10.4 mmol) of 4,6-diaminoresorcinol dihydrochloride and 2.12 g (10.5 mmol) of sebacic acid are mixed with 60.4 g of polyphosphoric acid containing about 77.1 percent $P_2O_5$ by weight. Nitrogen atmosphere and vigorous stirring are maintained throughout the reaction. The mixture is heated at 45° C. for 16 hr. The temperature of the reaction is raised to 95° C., 27.5 g of $P_2O_5$ are added, and the reaction is continued at 95° C. for 4 hr. 8.57 g of cis-PBO dope from Example A(2) is added, and the reaction is continued at 95° C. for 20 hr. The reaction is continued at 150° C. for 24 hr. The resulting composition containing the title block copolymer is coagulated in a solution of 5.92 g of potassium dihydrogen phosphate and 21.6 g of disodium hydrogen phosphate in 1 L of water. The polymer is isolated and its inherent viscosity measured as described in Example 1. The polymer has an inherent viscosity of 25.0 dL/g. 40 g of the dope is mixed with 51.4 g of methanesulfonic acid form a dope for processing into films.

EXAMPLE 11

Synthesis of 30% rigid rod PBO/70% aliphatic PBO block copolymer by reaction of rigid rod polymer with monomers for aliphatic PBO Under nitrogen atmosphere 6.63 g (31.1 mmol) of 4,6-diaminoresorcinol dihydrochloride and 6.36 g (31.4 mmol) of sebacic acid are mixed with 181.2 g of polyphosphoric acid containing about 77.1 percent $P_2O_5$ by weight. Nitrogen atmosphere and vigorous stirring are maintained throughout the reaction. The mixture is heated at 45° C. for 16 hr. The temperature of the reaction is raised to 95° C., 82.5 g of $P_2O_5$ are added, and the reaction is continued at 95° C. for 4 hr. 25.7 g of cis-PBO dope from Example A(2) is added, and the reaction is continued at 95° C. for 20 hr. The reaction is continued at 150° C. for 24 hr. The resulting composition containing the title block copolymer is coagulated in a solution of 5.92 g of potassium dihydrogen phosphate and 21.6 g of disodium hydrogen phosphate in 1 L of water. The polymer is isolated and its inherent viscosity measured as described in Example 1. The polymer has an inherent viscosity of 23.2 dL/g. The dope is diluted with 300 g of a solution of methanesulfonic acid and $P_2O_5$ prior to processing.

EXAMPLE 12

Synthesis of 30% rigid rod PBO/70% aliphatic PBO block copolymer by reaction of rigid rod polymer with monomers for aliphatic PBO Under nitrogen atmosphere, 3.31 g (15.5 mmol) of 4,6-diaminoresorcinol dihydrochloride and 3.18 g (15.7 mmol) of sebacic acid are mixed with 150.8 g of polyphosphoric acid containing about 76.4 percent $P_2O_5$ by weight. Nitrogen atmosphere and vigorous stirring are maintained throughout the reaction. The mixture is heated at 45° C. for 16 hr. The temperature of the reaction is raised to 95° C., 71.0 g of $P_2O_5$ are added, and the reaction is continued at 95° C. for 1 hr. 12.85 g of cis-PBO dope from Example A(2) is added, and the reaction is continued at 95° C. for 23 hr. The reaction is continued at 150° C. for 24 hr. During the last 30 minutes, the reaction mixture is degassed at 80 mmHg with a nitrogen bleeding regulator. The resulting composition containing the title block copolymer is coagulated in a solution of water buffered with phosphates. The polymer is isolated and its inherent viscosity measured as described in Example 1. The polymer has an inherent viscosity of 31.1 dL/g at a concentration of 0.0458 g/dL.

EXAMPLE 13

Synthesis of 50% rigid rod PBO/50% aliphatic PBO block copolymer by reaction of rigid rod polymer with monomers for aliphatic PBO Under nitrogen atmosphere, 1.58 g (7.40 mmol) of 4,6-diaminoresorcinol dihydrochloride and 1.54 g (7.59 mmol) of sebacic acid are mixed with 172.4 g of polyphosphoric acid containing about 76.4 percent $P_2O_5$ by weight. Nitrogen atmosphere and vigorous stirring are maintained throughout the reaction. The mixture is heated at 45° C. for 16 hr. The temperature of the reaction is raised to 95° C., 71.0 g of $P_2O_5$ are added, and the reaction is continued at 95° C. for 4 hr. 14.3 g of cis-PBO dope from Example A(7) is added, and the reaction is continued at 95° C. for 24 hr. The reaction is continued at 150° C. for 48 hr. The reaction mixture is degassed at 80 mmHg before removing from the reaction vessel. The resulting composition containing the title block copolymer is coagulated in a solution of water buffered with phosphates. The polymer is isolated and its inherent viscosity measured as described in Example 1. The polymer has an inherent viscosity of 27.4 dL/g at a concentration of 0.045 g/dL.

EXAMPLE 14

Synthesis of 70% rigid rod PBO/30% aliphatic PBO block copolymer by reaction of rigid rod polymer with monomers for aliphatic PBO Under nitrogen atmosphere, 0.28 g (1.29 mmol) of 4,6-diaminoresorcinol dihydrochloride and 0.28 g (1.37 mmol) of sebacic acid are mixed with 76.4 g of polyphosphoric acid containing about 76.2 percent $P_2O_5$ by weight. Nitrogen atmosphere and vigorous stirring are maintained throughout the reaction. The mixture is heated at 45° C. for 16 hr. The temperature of the reaction is raised to 95° C., 34.6 g of $P_2O_5$ are added, and the reaction is continued at 95° C. for 5 hr. 5.86 g of cis-PBO dope from Example A(2) is added, and the reaction is continued at 95° C. for 16 hr. The reaction is continued at 150° C. for 24 hr. The resulting composition containing the title block copolymer is coagulated in a solution of water buffered with phosphates. The polymer is isolated and its inherent viscosity measured as described in Example 1. The polymer has an inherent viscosity of 15.5 dL/g at a concentration of 0.0468 g/dL.

EXAMPLE 15

Fiber Synthesis and Tests

Fibers are spun from dopes according to the following procedure and the conditions indicated in Table III hereinafter. Dope produced in the indicated Example is placed in a Teflon ™-lined extrusion vessel and degassed for about 18 hours at 0.4 in. Hg pressure and about 80° C. The extrusion vessel is fitted with a Teflon ™ piston and driving mechanism and, at the bottom, a spinnerette with an aperture of 5 to 10 mil (1 mil = $10^{-3}$ in.). The entire assembly is seated over a water bath with a variable air gap (AG) between the spinnerette and the bath, as indicated in Table III hereinafter. The water temperature is maintained at 20° C. to 26° C. and the water depth at 7-8 in. The temperature of the extrusion vessel and spinnerette are controlled as shown in Table II.

Pressure (P) is applied as shown in Table III, forcing dope out through the spinnerette. The dope drops across the air gap (AG) into the bath and coagulates as a fiber, which is transferred to a nylon spool and stretched to a maximum by spin-drawing as shown in Table III. The stretched fiber is washed for at least 48 hours, air dried for 4 hours and vacuum dried at 100° C. for four hours.

The results are reported in Table III below wherein:

Example is the Example previously set out in which the dope was synthesized;

AG is the air gap between the spinnerette and the water bath in inches;

Temp is in the temperature of the die and extrusion vessel in °C.;

P is the extrusion pressure in psi; and

SDR is the spin-draw ratio, expressed as the length of the fiber after spin-drawing divided by the length of the fiber before spin-drawing.

TABLE III

| | Spun Fibers & Properties | | | | |
|---|---|---|---|---|---|
| Sample | Example | A.G. | Temp | P | SDR |
| a | 3 | 3.0 | 160 | 560 | 3.33 |
| b | 3 | 3.0 | 160 | 300 | 6.96 |
| c | 6 | 2¼ | 40–80 | 20–100 | * |
| d | 6 | 2¼ | 20–25 | 20 | 1.24 |
| e | 7 | 1¼ | 190 | 200 | 1.39 |
| f | 8 | 2¼ | 150 | 200 | * |
| g | 8 | 2¼ | 150 | 220 | 1.33 |
| h | 8 | 2¼ | 150 | 220 | * |
| i | 12 | 2.0 | 150 | 120 | 1.40 |
| j | 13 | 2¼ | 150 | 60 | 1.52 |
| k | 14 | * | 80 | 80 | * |

\* - not recorded

Certain fibers from Table III are heat-treated by drawing under tension through an 18-inch tubular oven under nitrogen atmosphere at the temperature, and with the residence time shown in Table IV, providing the additional spin-draw ratio shown in Table IV. Ten samples of each fiber are mounted, measured and tested according to ASTM D3379-75 using a paper tab and epoxy mounting method. The diameter of each sample is measured three times using a Nikon-Optiphot TM microscope and calibrated lens, and an average diameter taken. The tensile strength and modulus are tested at 22° C. to 24° C. and 52 percent to 55 percent humidity using an Instron 4201 TM tensile tester. The resulting curve is analyzed and the tensile strength, tensile modulus and percent elongation to break are calculated as outlined in ASTM D3379-75. The results are reported in Table IV below wherein:

Sample identifies the Sample from Table III which is treated and tested;

T identifies the temperature of the oven in °C.;

Res. T. identifies the residence time of the fiber in the oven in minutes;

SDR identifies the spin-draw ratio of the heat treated fiber, expressed as the length of the heat-treated fiber divided by the length of the untreated fiber from Table III;

Diam. is the diameter of the heat treated fiber;

T.M. is the tensile modulus of the fiber in msi (1 msi=1,000,000 psi);

T.S is the tensile strength of the fiber in ksi (1 ksi=1,000 psi); and

Elong. is the percent elongation of the fiber before it breaks. and all other columns have the meaning previously assigned.

TABLE IV

| | Heat-treated Fibers & Properties | | | | | |
|---|---|---|---|---|---|---|
| Sample | T | Res. t | SDR | Diam | T.M. | T.S. | Elong. |
| a | 400 | 2.88 | 1.09 | 1.41 | 6.77 | 88.47 | 1.92 |
| a | 400 | 1.97 | 1.13 | 1.49 | 4.46 | 58.09 | 2.02 |
| b | 400 | 3.02 | 1.13 | 1.22 | 6.78 | 78.01 | 1.37 |
| c | 500 | 0.5 | 1.06 | 1.30 | 5.96 | 102.0 | 3.92 |
| d | 500 | 2 × 0.5 | 1.12 | 1.77 | 5.45 | 89.6 | 2.69 |
| e | 500 | 0.5 | 1.12 | 1.35 | 7.6 | 95.53 | 1.80 |
| f | 400 | 1.8 | 1.40 | 4.19 | 8.54 | 49.05 | 1.79 |
| g | 400 | 2.35 | 1.094 | 2.27 | 4.79 | 54.3 | 2.01 |
| h | 400 | 1.67 | 1.29 | 2.52 | 3.38 | 43.26 | 2.0 |
| i | 250 | 2.4 | 1.2 | 1.5 | 5.0 | 65 | 2.5 |
| j | 250 | 1.0 | 1.085 | 0.9 | 8.5 | 80 | 1.0 |
| k | 400 | 2.0 | 1.10 | 0.6 | 10 | 140 | 3.5 |

EXAMPLE 16

Film Casting and Properties

A dope solution is placed in an extrusion vessel, degassed and fitted with a piston as described in Example 12. A 1½ in. die with an adjustable gap is connected to the extrusion vessel by a stainless steel line. The extrusion vessel, line and die are maintained at about 80° C. The die is seated above a 6-in. stainless steel drum roller which is partially submerged in a 3-ft water trough with water at a temperature of about 24° C. Pressure is applied to the dope, forcing it out of the die onto the drum, which rotates to bring the extruded dope into contact with the water. The coagulated dope passes through three submerged idle rollers to a submerged take-up spool. The collected film is washed under water for at least 48 hours and cut into 4-ft lengths which are wrapped onto glass tubes. The tubes are air dried for 24 hours and dipped in water to release. The tubes are then vacuum dried at a appropriate temperature.

The dried film is cut into strips and its tensile properties are tested according to ASTM D882-83 using the equipment and conditions described in Example 12. The results are reported in Table V hereinafter, wherein Example sets out the Example in which the dope was prepared;

P sets out the pressure used to extrude the dope in psi;

Die gap sets out the width of the gap in the extrusion die in mil; and all other columns have the meanings assigned in Example 12.

TABLE V

| | Film Extrusion & Properties | | | | |
|---|---|---|---|---|---|
| Sample | Example | P | Die Gap | T.S. | T.M. | Elong. |
| a | 7 | 330 | 8 | 31.51 | 1.26 | 8.73 |
| b | 9 | 80 | 10 | * | * | * |
| c | 10 | 80 | 13 | 21.76 | .769 | 34 |
| d | 11 | 30–60 | 13 | 18.04 | .771 | 19.6 |

The glass transition temperatures of films 16 (b) and 16 (d) are analyzed by finding the maximum of the tan δ via dynamic mechanical thermal analysis. Film 16 (b) has a glass transition temperature at about 415° C., and Film 16 (d) has a glass transition temperature at about 165° C.

We claim:

1. A substantially non-phase-separated block copolymer comprising:

(1) a rigid rod PBZ block containing at least 10 mer units; and (2) a thermoplastic PBZ block containing a plurality of mer units, which substantially non-phase-separated block copolymer has a glass transition temperature below its decomposition temperature and can be heated to its glass transition temperature without experiencing substantial phase-separation.

2. A block copolymer of claim 1 wherein each aromatic group in the block copolymer is independently carbocyclic or a nitrogen heterocycle and independently contains no more than about 18 carbon atoms.

3. A block copolymer of claim 2 wherein each rigid rod block and each thermoplastic PBZ block contains on average at least about 25 mer units.

4. A block copolymer of claim 2 wherein said thermoplastic PBZ block is an aliphatic PBZ block.

5. A block copolymer of claim 4 wherein the thermoplastic PBZ block contains a plurality of aliphatic PBZ mer units which each comprise:

(1) an aromatic group;
(2) a first azole ring fused to said aromatic group; and
(3) an aliphatic group having at least 3 carbon atoms bonded to the 2 carbon of said first azole ring.

6. A block copolymer of claim 5 wherein said aliphatic PBZ mer units conform with the formula:

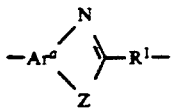

wherein $Ar^a$ is an aromatic group; Z is an oxygen atom, a sulfur atom or a nitrogen atom bonded to a hydrogen atom or an organic substituent; and $R^1$ is an aliphatic moiety having at least three carbon atoms, and wherein the bonds to $R^1$ are not to the same carbon atom or to adjacent carbon atoms.

7. A block copolymer of claim 6 wherein $R^1$ comprises no more than about 12 carbon atoms.

8. A block copolymer of claim 5 wherein each aliphatic PBZ mer unit further comprises:
(4) a second azole ring fused to said aromatic group.

9. A block copolymer of claim 8 wherein said aliphatic PBZ mer units each conform with the formula:

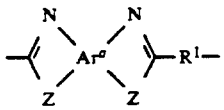 (b)

wherein $Ar^a$ is an aromatic group; Z is an oxygen atom, a sulfur atom or a nitrogen atom bonded to a hydrogen atom or an organic substituent; and $R^1$ is an aliphatic moiety having at least three carbon atoms, and wherein the bonds to $R^1$ are not to the same carbon atom or to adjacent carbon atoms.

10. A block copolymer of claim 9 wherein $R^1$ comprises no more than about 12 carbon atoms.

11. A block copolymer of claim 9 wherein $Ar^a$ comprises no more than about 6 carbon atoms.

12. A block copolymer of claim 9 wherein $Ar^a$ is a tetravalent benzene moiety.

13. A block copolymer of claim 9 wherein $Ar^a$ comprises two aromatic moieties linked by a divalent linking moiety containing an oxygen atom, a sulfur atom, a sulfonyl moiety or an aliphatic moiety.

14. A block copolymer of claim 8 which has a glass transition temperature below about 250° C.

15. A block copolymer of claim 8 which has a glass transition temperature no higher than about 175° C.

16. A block copolymer of claim 8 wherein each thermoplastic block contains on average at least about 20 mer units.

17. A block copolymer of claim 4 wherein rigid rod blocks make up on average at least 5 weight percent of the block copolymer and thermoplastic blocks make up at least about 5 weight percent of the block copolymer.

18. A block copolymer of claim 4 wherein rigid rod blocks make up on average at least 10 weight percent of the block copolymer and thermoplastic blocks make up at least about 10 weight percent of the block copolymer.

19. A block copolymer of claim 4 wherein rigid rod blocks make up on average at least 20 weight percent of the block copolymer and thermoplastic blocks make up at least about 20 weight percent of the block copolymer.

20. A block copolymer of claim 4 wherein both the rigid rod and the thermoplastic blocks comprise PBO or PBT or a copolymer thereof.

21. A block copolymer of claim 2 wherein said thermoplastic block is a jointed PBZ polymer.

22. A block copolymer of claim 21 wherein said thermoplastic block contains a plurality of mer units which each independently comprise:
(1) a first AB-PBZ moiety having an aromatic group ($Ar^3$) and a single azole ring fused with said aromatic group;
(2) a second AB-PBZ moiety independently having a description similar to the first AB-PBZ moiety;
(3) a bond or a first divalent linking moiety (X), which is inert with respect to all reagents under reaction conditions, bonded to the aromatic group in each of the first and second AB-PBZ moieties; and
(4) a non-linear group (L) bonded to the 2-carbon in the azole ring of the second AB-PBZ moiety and to the 2-carbon in the azole ring of the first AB-PBZ moiety of an adjacent mer unit, which non-linear group contains:
(a) a meta-aromatic group; or
(b) two aromatic groups linked by a second divalent linking moiety; or
(c) an aliphatic moiety wherein bonds from the azole rings are to the same carbon atom or adjacent carbon atoms.

23. A block copolymer of claim 22 wherein said mer units of the thermoplastic block conform to the formula:

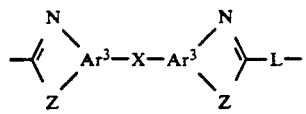 18 wherein:
X is a bond or the first divalent linking moiety;
each $Ar^3$ is an aromatic group;
L is a non-linear group; and
each Z is independently an oxygen atom, a sulfur atom, or a nitrogen atom bonded to a hydrogen atom or an organic substituent.

24. A block copolymer of claim 23 wherein L is chosen from on of the formulae:

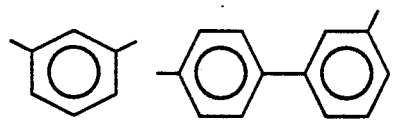

(a)          (b)

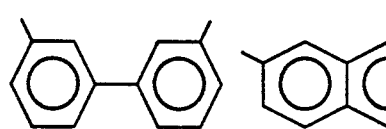

(c)          (d)

or a substituted or heterocyclic variation thereof.

25. A block copolymer of claim 24 wherein L is neither substituted nor heterocyclic.

26. A block copolymer of claim 23 wherein L conforms to the formula:

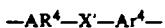

and X' conforms to one of the formulae:

and each Y is independently an oxygen atom or a sulfonyl group, and each Ar and Ar⁴ is independently an aromatic group.

27. A block copolymer of claim 26 wherein X' consists of a sulfonyl moiety or an oxygen atom.

28. A block copolymer of claim 23 wherein L is an aliphatic moiety and the illustrated bonds to L are to the same or adjacent carbon atoms.

29. A block copolymer of claim 22 wherein each said non-linear group independently contains an m-aromatic group.

30. A block copolymer of claim 29 wherein each m-aromatic group independently contains an m-phenylene group, a 3,4'-biphenylene group, a 3,3'-biphenylene group, a 1,4-naphthylene group or nitrogen heterocycles thereof.

31. A block copolymer of claim 22 wherein each said non-linear group independently comprises an aliphatic group.

32. A block copolymer of claim 31 wherein each said aliphatic group is independently an alkyl group or a halogenated alkyl group.

33. A block copolymer of claim 22 wherein each said non-linear group independently comprises two aromatic groups linked by a second divalent linking moiety.

34. A block copolymer of claim 33 wherein the first divalent linking moiety and the second divalent linking moiety each independently comprise an oxygen atom or a sulfonyl moiety.

35. A block copolymer of claim 34 wherein the first divalent linking moiety comprises a sulfonyl group and the second divalent linking moiety comprises an oxygen atom.

36. A block copolymer of claim 35 wherein mer units in the thermoplastic block conform to the formula

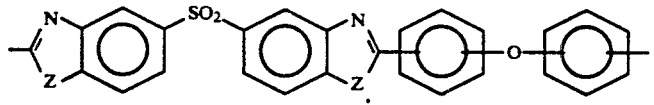

wherein each Z is independently an oxygen atom or a sulfur atom, or the variation thereof wherein the sulfonyl group is bonded to the AB-PBZ moieties meta to the Z groups and para to the nitrogen atoms.

37. The block copolymer of claim 36 wherein each Z is an oxygen atom.

38. The block copolymer of claim 22 wherein the glass transition temperature of the block copolymer is no higher than 450° C.

39. The block copolymer of claim 22 wherein the thermoplastic blocks make up at least 5 percent by weight of the block copolymer and the rigid rod blocks make up at least about 5 percent by weight of the block copolymer.

40. The block copolymer of claim 22 wherein the thermoplastic blocks make up at least 10 percent by weight of the block copolymer and the rigid rod blocks make up at least about 10 percent by weight of the block copolymer.

41. The block copolymer of claim 22 wherein the thermoplastic blocks make up at least 20 percent by weight of the block copolymer and the rigid rod blocks make up at least about 20 percent by weight of the block copolymer.

42. The block copolymer of claim 22 wherein the rigid rod block and the thermoplastic block each independently comprise polybenzoxazole or polybenzothiazole.

43. The block copolymer of claim 22 wherein the rigid rod block is an intrinsic rigid rod.

44. The block copolymer of claim 2 which comprises a moiety complying with the formula

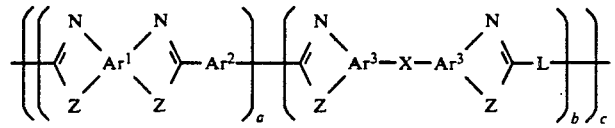

wherein $Ar^1$, $Ar^2$ and each $Ar^3$ are aromatic groups comprising no more than about 12 carbon atoms; each Z is independently an oxygen atom or a sulfur atom; each X is independently a divalent linking moiety comprising an oxygen atom, a sulfonyl moiety, a sulfur atom or an aliphatic group; each L is independently a non-linear group bonded to the 2-carbon in the azole ring of the second AB-PBZ moiety and to the 2-carbon in the azole ring of the first AB-PBZ moiety of an adjacent mer unit, which non-linear group contains:
  (a) a meta-aromatic group; or
  (b) two aromatic groups linked by a second divalent linking moiety; or
  (c) an aliphatic moiety having bonds to the non-linear group bonded to the same or adjacent carbon atoms;

each a and b is a number of repeating units independently averaging at least 10; and c is a number of units at least equal to 1.

45. The block copolymer of claim 44 wherein $Ar^1$ and each $Ar^3$ comprise no more than about 6 carbon atoms, and wherein L comprises two aromatic groups having no more than about 6 carbon atoms and linked by a second divalent linking moiety, and wherein the first and second divalent linking moiety each independently comprise an oxygen atom or a sulfonyl group.

46. The block copolymer of claim 45 which comprises a moiety conforming to the formula:

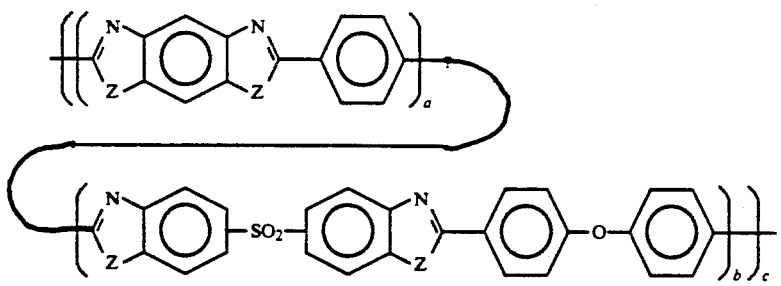

wherein each Z is an oxygen atom or a sulfur atom and wherein the sulfonyl group is bonded to each AB-PBZ group para to either the nitrogen atom or the Z group.

47. The block copolymer of claim 2 which comprises a moiety conforming to the formula:

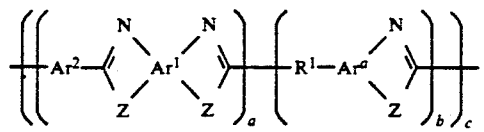

wherein $Ar^1$, $Ar^2$ and each $Ar^a$ are aromatic groups comprising no more than about 12 carbon atoms; each Z is independently an oxygen atom or a sulfur atom; $R^1$ is an aliphatic group comprising from 3 carbon atoms to about 12 carbon atoms in which the illustrated bonds are not to the same carbon atom or an adjacent carbon atom; a and b are each individually a number of repeating units averaging at least 10; and c is a number of units at least equal to 1.

48. The block copolymer of claim 47 wherein $Ar^1$, $Ar^2$ and $Ar^a$ each comprise no more than about 6 carbon atoms, and $R^1$ is alkyl or halogenated alkyl.

49. The block copolymer of claim 48 wherein $Ar^1$, $Ar^2$ and $Ar^a$ are each hydrocarbyl.

50. The block copolymer of claim 2 which comprises a moiety conforming to the formula:

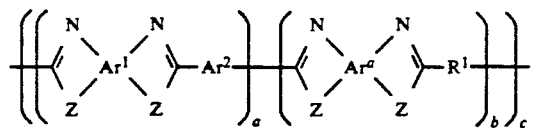

wherein $Ar^1$, $Ar^2$ and $Ar^a$ are each aromatic groups comprising no more than about 12 carbon atoms; each Z is independently an oxygen atom or a sulfur atom; $R^1$ is an aliphatic group comprising from 3 carbon atoms to about 12 carbon atoms in which the illustrated bonds are not to the same carbon atom or an adjacent carbon atom; a and b are each a number of repeating units averaging at least 10; and c is a number of units at least equal to 1.

51. The block copolymer of claim 50 wherein $Ar^1$, $Ar^2$ and $Ar^a$ each comprise no more than about 6 carbon atoms, and $R^1$ is alkyl or halogenated alkyl.

52. The block copolymer of claim 51 wherein $Ar^1$, $Ar^2$ and $Ar^a$ are each hydrocarbyl.

53. A block copolymer of claim 2 wherein phase-separated domains within the block copolymer have dimensions averaging no more than about 1000 angstroms.

54. A block copolymer of claim 2 wherein phase-separated domains within the block copolymer have dimensions averaging no more than about 500 angstroms.

55. A block copolymer of claim 2 wherein phase-separated domains within the block copolymer have dimensions averaging no more than about 200 angstroms.

56. A block copolymer of claim 2 wherein phase-separated domains within the block copolymer have dimensions averaging no more than about 100 angstroms.

57. A block copolymer of claim 2 wherein phase-separated domains within the block copolymer have dimensions averaging no more than about 50 angstroms.

58. A block copolymer of claim 2 which does not cause wide angle X-ray scattering.

59. A shaped article comprising a block copolymer of claim 1, wherein polymer in the shaped article is not substantially phase-separated.

* * * * *

UNITED STATES PATENT AND TRADEMARK OFFICE
CERTIFICATE OF CORRECTION

PATENT NO. : 5,075,392

DATED : December 24, 1991

INVENTOR(S) : William J. Harris; Zenon Lysenko; Wen-Fang Hwang, all of Midland, Michigan It is certified that error appears in the above-identified patent and that said Letters Patent is hereby corrected as shown below:

Column 34, line 49, delete " on " and insert -- one --.

Column 35, line 4, delete " -AR$^4$-X'-Ar$^4$ " and insert -- -Ar$^4$-X'-Ar$^4$- --.

Column 35, lines 52 through 59, delete

"
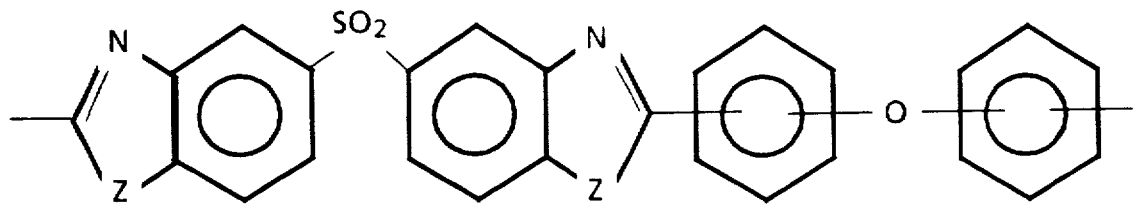
"

and insert

--
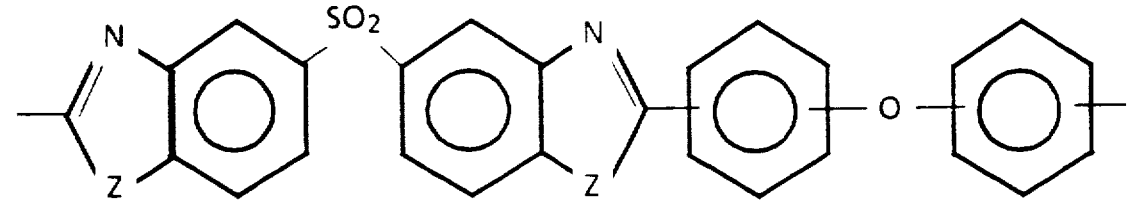
--

Signed and Sealed this

Fourth Day of May, 1993

Attest:

MICHAEL K. KIRK

*Attesting Officer*   Acting Commissioner of Patents and Trademarks